(12) United States Patent
Nishizawa

(10) Patent No.: US 9,394,819 B2
(45) Date of Patent: Jul. 19, 2016

(54) EXHAUST GAS PROCESSING DEVICE, DIESEL ENGINE, AND EXHAUST GAS PROCESSING METHOD

(71) Applicant: Komatsu Ltd., Tokyo (JP)

(72) Inventor: Izumi Nishizawa, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/425,163

(22) PCT Filed: Jul. 18, 2013

(86) PCT No.: PCT/JP2013/069556
§ 371 (c)(1),
(2) Date: Mar. 2, 2015

(87) PCT Pub. No.: WO2014/203406
PCT Pub. Date: Dec. 24, 2014

(65) Prior Publication Data
US 2015/0252707 A1  Sep. 10, 2015

(51) Int. Cl.
*F01N 3/20* (2006.01)
*F01N 3/08* (2006.01)
(Continued)

(52) U.S. Cl.
CPC ............ *F01N 3/0821* (2013.01); *F01N 3/0842* (2013.01); *F01N 3/208* (2013.01);
(Continued)

(58) Field of Classification Search
CPC ......... F01N 3/021; F01N 3/208; F01N 9/005; F01N 13/009; F01N 13/011; F01N 2560/026; F01N 2560/06; F01N 2560/08; F01N 2560/14; F01N 2610/02; F01N 2900/1402; F01N 2900/12; F01N 2900/1404; F01N 2900/1406; F01N 2900/1411

USPC ......... 60/274, 276, 286, 291, 295, 297, 301, 60/311, 324
See application file for complete search history.

(56) References Cited

U.S. PATENT DOCUMENTS 6,779,339 B1  8/2004  Laroo et al.
6,829,889 B2  12/2004  Saito et al.
(Continued)

FOREIGN PATENT DOCUMENTS

CN  1492965 A   4/2004
DE  60216684 T2  10/2007
(Continued)

OTHER PUBLICATIONS

International Search Report and Written Opinion mailed Sep. 3, 2013, issued for PCT/JP2013/069556.
(Continued)

*Primary Examiner* — Jorge Leon, Jr.
(74) *Attorney, Agent, or Firm* — Locke Lord LLP

(57) ABSTRACT

An exhaust gas purifying device includes a first branch pipe and a second branch pipe that cause exhaust gas exhausted from a diesel engine to branch into a plurality of passages and pass through the passages, a first exhaust gas purification unit and a second exhaust gas purification unit that purify the exhaust gas, an exhaust gas temperature sensor that detects a temperature of the exhaust gas, an atmospheric pressure sensor, and a processing unit that obtains a convergence portion pressure at a convergence portion from a relationship obtained in advance between the convergence portion pressure, a total flow rate of the exhaust gas, a convergence portion temperature, and an atmospheric pressure.

12 Claims, 6 Drawing Sheets

(51) Int. Cl.
  *F01N 13/00*  (2010.01)
  *F01N 3/021*  (2006.01)
  *F01N 9/00*   (2006.01)

(52) U.S. Cl.
  CPC ............. *F01N 9/002* (2013.01); *F01N 13/009* (2014.06); *F01N 13/011* (2014.06); *F01N 3/021* (2013.01); *F01N 9/005* (2013.01); *F01N 2560/026* (2013.01); *F01N 2560/06* (2013.01); *F01N 2560/08* (2013.01); *F01N 2560/14* (2013.01); *F01N 2570/14* (2013.01); *F01N 2610/02* (2013.01); *F01N 2610/14* (2013.01); *F01N 2900/0416* (2013.01); *F01N 2900/0601* (2013.01); *F01N 2900/08* (2013.01); *F01N 2900/12* (2013.01); *F01N 2900/1402* (2013.01); *F01N 2900/1404* (2013.01); *F01N 2900/1406* (2013.01); *F01N 2900/1411* (2013.01)

(56) References Cited

U.S. PATENT DOCUMENTS

| | | |
|---|---|---|
| 6,877,312 B2 | 4/2005 | Nakatani et al. |
| 7,171,803 B2 | 2/2007 | Saito et al. |
| 2003/0061802 A1 | 4/2003 | Nakatani et al. |
| 2003/0230075 A1 | 12/2003 | Saito et al. |
| 2004/0006977 A1 | 1/2004 | Nakatani et al. |
| 2004/0118108 A1 | 6/2004 | Ripper et al. |
| 2006/0005534 A1* | 1/2006 | Wirth ................ F01N 9/002 60/291 |
| 2006/0242950 A1* | 11/2006 | Wang ................ F01N 3/023 60/295 |
| 2007/0079607 A1 | 4/2007 | Suzuki et al. |
| 2009/0193904 A1* | 8/2009 | Takahashi .......... B01D 46/0086 73/716 |

FOREIGN PATENT DOCUMENTS

| | | |
|---|---|---|
| EP | 2787186 A1 | 10/2014 |
| JP | 2004-019523 A | 1/2004 |
| JP | 2004-044514 A | 2/2004 |
| JP | 2005-240730 A | 9/2005 |
| JP | 2005-273457 A | 10/2005 |
| JP | 2006-233893 A | 9/2006 |
| JP | 2013-113194 A | 6/2013 |

OTHER PUBLICATIONS

Office Action mailed May 10, 2016, issued for the German patent application No. 112013004414.5.

\* cited by examiner

EXHAUST GAS PROCESSING DEVICE, DIESEL ENGINE, AND EXHAUST GAS PROCESSING METHOD

FIELD

The present invention relates to an exhaust gas processing device that processes exhaust gas exhausted from a diesel engine, a diesel engine, and an exhaust gas processing method.

BACKGROUND

Retarding a diesel engine, to reduce an amount of NOx (nitrogen oxide) contained in exhaust gas, for example, Patent Literature 1 describes a technique that processes exhaust gas from a diesel, engine by two NOx occlusion reduction type catalysts.

CITATION LIST

Patent Literature

Patent Literature 1: Japanese Patent Application Laid-open No. 2006-233093

SUMMARY

Technical Problem

When exhaust gas exhausted from a diesel engine is branched into a plurality of passages and purified, to estimate an amount of PM (Particulate Matter) accumulated in a particulate filter, it is necessary to obtain a flow rate of the exhaust gas flowing through each passage. Further, when exhaust gas is purified by using so-called urea SCR (Selective Catalytic Reduction), to decide an amount of reducing agent supplied to a reducing catalyst, it is necessary to obtain a flow rate of the exhaust gas flowing through each passage.

Patent Literature 1 describes that exhaust gas exhausted from a diesel engine is branched into a plurality of passages and purified and then the purified exhausted gas is converged and exhausted. In such a structure, due to effects of pipe resistance at a convergence portion where the passages converge, it is difficult to obtain accurate pressure at the convergence portion. As a result, at may be impossible to obtain an accurate flow rate of the exhaust gas flowing through each passage.

An object of the present invention is to, when the exhaust gas exhausted from a diesel engine is branched into a plurality of passages and purified and then the purified exhausted gas is converged and exhausted, suppress degradation of accuracy when obtaining the pressure at the convergence portion, which is necessary to obtain the flow rate of the exhaust gas flowing through each passage.

Solution to Problem

The present invention provides an exhaust gas processing device comprising: an exhaust gas introduction passage that exhausts exhaust gas exhausted from a diesel engine; a plurality of first exhaust gas passages which are branched from the exhaust gas introduction passage and which exhaust the exhaust gas; an exhaust gas purification unit which is provided to each of the first exhaust as passages and which purifies the exhaust gas; a second exhaust gas passage which is provided to a portion where the plurality of first exhaust gas passages converge and which exhausts the exhaust gas exhausted from the plurality of first exhaust gas passages; an exhaust gas temperature sensor that detects a temperature of the exhaust gas at the portion where the plurality of first exhaust gas passages converge; an atmospheric pressure sensor that detects an atmospheric pressure; and a processing unit that obtains a convergence portion, pressure which is a pressure at the portion where the passages converge based on the total flow rate obtained while the diesel engine is operating, the temperature of the exhaust gas detected by the exhaust gas temperature sensor, and the atmospheric pressure detected by the atmospheric pressure sensor.

In the present invention, it is preferable that a throttle unit that reduces a sectional area of the first exhaust gas passage is provided at each of the first exhaust gas passages provided on a downstream side of the exhaust gas purification unit in each exhaust gas flowing direction.

In the present invention, it is preferable that each of the exhaust gas purification units is provided to each of the first exhaust gas passages and which includes a reducing catalyst that reduces NOx in the exhaust gas by a reducing agent, each of the first exhaust gas passages includes a NOx detection sensor which is arranged on an upstream side of the reducing catalyst in an exhaust gas flowing direction and which detects a concentration of NOx contained in the exhaust gas exhausted from the diesel engine, and a pressure sensor which is arranged on an upstream side of each of the reducing catalysts in the exhaust gas flowing direction and which detects a pressure in each of the first exhaust gas passages, and the processing unit obtains a flow rate ratio of the exhaust gas flowing through each of the first exhaust gas passages based on a detection value of each of the pressure sensors, obtains a flow rate of the exhaust gas flowing through each of the first exhaust gas passages based on the obtained flow rate ratio and the total flow rate, obtains a flow rate of NOx in each of the first exhaust gas passages from the obtained flow rate of the exhaust gas in each of the first exhaust gas passages and the concentration of NOx detected by the NOx detection sensor, and obtains an amount of reducing agent to be given to each of the reducing catalysts from the obtained flow rate of NOx in each of the first exhaust gas passages.

In the present invention, it is preferable that the processing unit obtains the total flow rate from an intake air amount of the diesel engine and a fuel injection amount to the diesel engine.

In the present invention, it is preferable that the exhaust gas temperature sensor is provided to each of the first exhaust gas passages and detects a temperature of exhaust gas flowing through each of the first exhaust gas passages, and a pre-processing unit obtains a flow rate of exhaust gas flowing through the first exhaust gas passage by further using the temperature of exhaust gas detected by the exhaust gas temperature sensor.

In the present invention, it is preferable that a particulate filter s provided on an upstream side of each of the reducing catalysts in the exhaust gas flowing direction, and each of the pressure sensors is arranged between each pair of the particulate filter and the reducing catalyst.

The present invention provides a diesel engine comprising the exhaust gas processing device.

The present invention provides an exhaust gas processing method which obtains a convergence portion pressure which is a pressure at a portion where a plurality of first exhaust gas passages converge, in an exhaust gas processing device in which exhaust gas is branched from an exhaust as introduction passage that exhausts exhaust gas exhausted from a diesel engine into the plurality of first exhaust gas passages each of which includes an exhaust gas purification device that purifies the exhaust gas, and thereafter the plurality of first exhaust as passages are converged to a second exhaust gas passage and the exhaust gas is exhausted from the second exhaust gas passage, the exhaust gas processing method comprising: acquiring a total flow rate of exhaust gas exhausted from the diesel engine while the diesel engine is operating, a temperature of the exhaust gas at the portion where the plurality of first exhaust gas passages converge, and the atmospheric pressure; and obtaining the convergence portion pressure based on the acquired total flow rate, the acquired temperature of the exhaust gas, and the acquired atmospheric pressure.

Advantageous Effects of Invention

When the exhaust gas exhausted from a diesel engine is branched into a plurality of passages and purified and then the purified exhausted gas is converged and exhausted, the present invention can suppress degradation of accuracy when obtaining the pressure at the convergence portion, which is necessary to obtain the flow rate of the exhaust gas flowing through each passage.

DESCRIPTION OF EMBODIMENTS

A mode for carrying out the present invention (an embodiment) will be described with reference to the drawings. In the embodiment, a flow rate of a fluid, that is, an amount of intake air, a flow rate of exhaust gas, and the like, are a mass flow rate.

<Diesel Engine>

Figure 1:
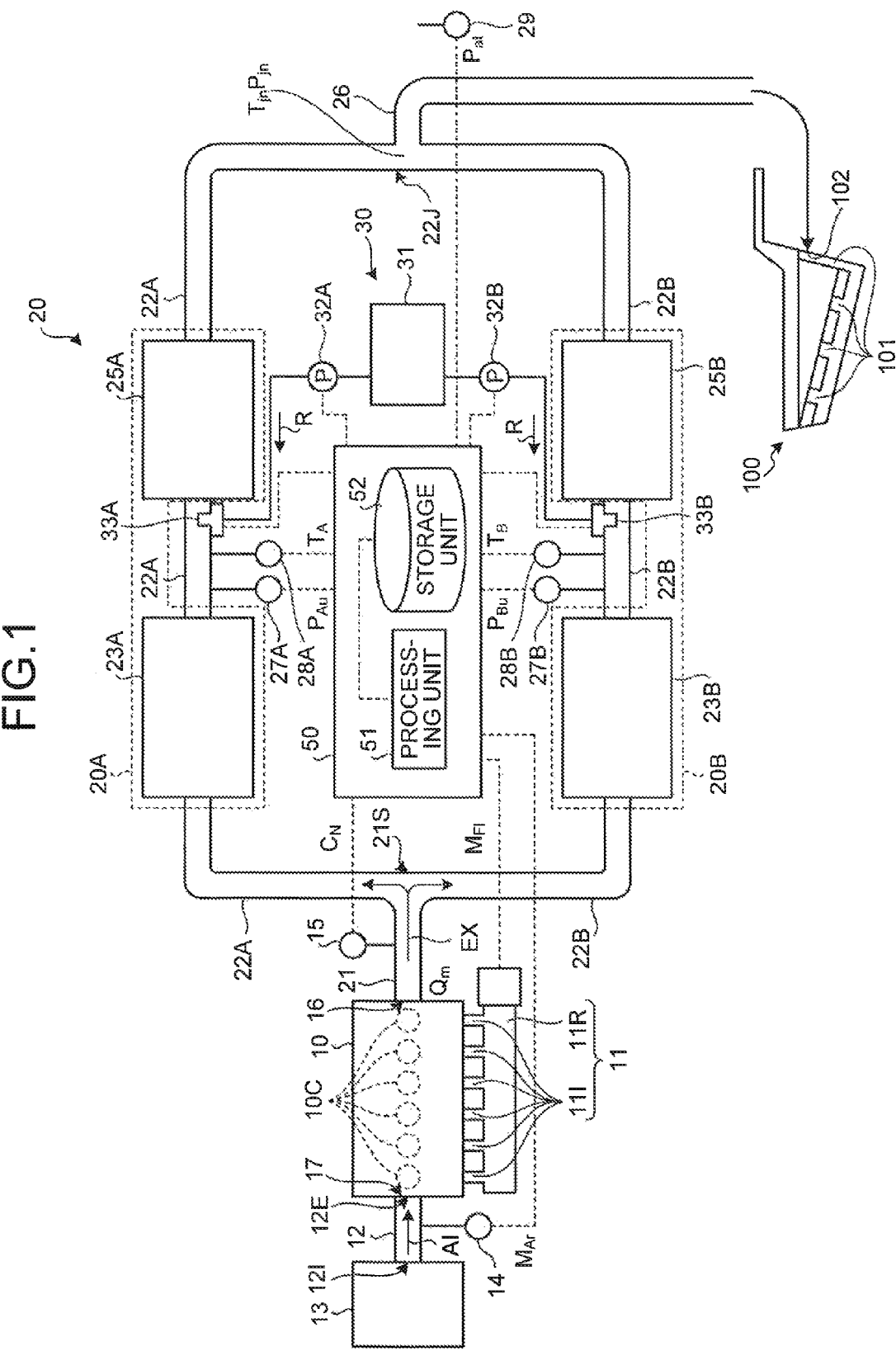
FIG. 1 is a schematic diagram illustrating a diesel engine including an exhaust gas processing device according to an embodiment.

FIG. 1 is a schematic diagram illustrating a diesel engine including an exhaust gas processing device according to the embodiment. A diesel engine 10 includes an exhaust gas processing device 20. The exhaust gas processing device 20 will be described later. The diesel engine 10 and the exhaust gas processing device 20 are controlled by a control device 50. The diesel engine 10 includes a fuel injection device 11 and an intake pipe 12 used as an intake passage. Further, an exhaust pipe 21 used as an exhaust gas introduction passage included in the exhaust gas processing device 20 is attached to an exhaust port 16 of the diesel engine 10.

An air cleaner 13 for removing dust in air is attached to an inlet port 121 of the intake pipe 12. An outlet port 12E of the intake pipe 12 is attached to an intake port 17 of the diesel engine 10. An intake air amount sensor 14 is attached to the intake pipe 12. The intake air amount sensor 14 detects a flow rate (a mass flow rate in the embodiment) of air AI sucked into the diesel, engine 10 through the intake pipe 12. The intake air amount sensor 14 is electrically connected to the control device 50. By such a structure, the control device 50 acquires a measurement value of the intake air amount sensor 14. The control device 50 uses the measurement value of the intake air amount sensor 14 for control of the diesel engine 10 such as control of the exhaust gas processing device 20.

The fuel injection device 11 supplies fuel to the diesel engine 10. More specifically, the fuel injection device 11 injects the fuel to a combustion chamber corresponding to each cylinder 100 included in the diesel engine 10. In the embodiment, the fuel injection device 11 is a so-called common-rail type device including an accumulator 11R and injectors 11I. The fuel injection device 11 is controlled by the control device 50. Specifically, for example, the control device 50 causes an appropriate amount of fuel to be injected from the injectors 11I according to operating conditions such as rotation speed and load of the diesel engine 10. In the embodiment, the fuel injection device 11 is not limited to the common-rail type device.

<Exhaust Gas Processing Device 20>

The exhaust gas processing device 20 is a device that purifies exhaust gas EX exhausted from the diesel engine 10. In the embodiment, the exhaust gas processing device 20 mainly reduces NOx (nitrogen oxide) included in the exhaust gas EX. In the present embodiment, the exhaust gas processing device 20 includes a first branch pipe 22A as a first exhaust gas passage, a second branch pipe 22B as a first exhaust gas passage, a first exhaust gas purification unit 20A as an exhaust gas purification unit, a second exhaust gas purification unit 20B as an exhaust gas purification unit, a second exhaust gas passage 26, a first temperature sensor 28A as an exhaust gas temperature sensor, a second temperature sensor 283 as an exhaust gas temperature sensor, an atmospheric pressure sensor 29, and a processing unit 51.

The first branch pipe 22A and the second branch pipe 22B, which are used as a plurality of first exhaust gas passages, are a plurality of passages that cause the exhaust gas EX exhausted from the diesel engine 10 to branch into the plurality of passages and pass trough the passages. As seen from the structure of the exhaust gas processing device 20, the first branch pipe 22T and the second branch pipe 22B branch from the exhaust pipe 21 used as an exhaust gas introduction passage. The exhaust pipe 21 exhausts the exhaust gas EX exhausted from the diesel engine 10. Then, the exhaust pipe 21 guides the exhaust gas EX to the first branch pipe 22A and the second branch pipe 22B of the exhaust gas processing device 20. The exhaust gas EX flowing through the exhaust pipe 21 branches and flows into the first branch pipe 22A and the second branch pipe 22B at a branch portion 21S at which the first branch pipe 22A and the second branch pipe 22B branch from the exhaust pipe 21.

The first exhaust gas purification unit 20A and the second exhaust gas purification unit 20B, which are used as exhaust gas purification units, are respectively provided to the first branch pipe 22A and the second branch pipe 22B and purify the exhaust gas EX. The second exhaust gas passage 26 is a passage provided to a portion at which the first branch pipe 22A and the second branch pipe 22B converge. The second exhaust gas passage 26 exhausts the exhaust gas EX exhausted from the first branch pipe 22A and the second branch pipe 22B. In the embodiment, the first branch pipe 22A and the second branch pipe 22B converged into the second exhaust gas passage 26 on the downstream side of the first exhaust gas purification unit 20A and the second exhaust gas purification unit 20B. In the embodiment, unless otherwise noted, the upstream side is the upstream side in a flowing direction of the exhaust gas EX in the exhaust gas processing device 20 and the downstream side is the downstream side in the flowing direction of the exhaust gas EX in the exhaust gas processing device 20.

The first temperature sensor 28A and the second temperature sensor 28B, which are used as exhaust gas temperature sensors, detect the temperature of the exhaust gas EX. In the embodiment, the first temperature sensor 28A is provided at the first branch pipe 22A. The second temperature sensor 28B is provided at the second branch pipe 22B. More specifically, the first temperature sensor 25A is provided on the upstream side of a first catalyst 25A used as a reducing catalyst included in the first exhaust gas purification unit 20A used as an exhaust gas purification unit. The second temperature sensor 28B is provided on the upstream side of a second catalyst 25B used as a reducing catalyst included in the second exhaust gas purification unit 20B used as an exhaust gas purification unit. The first catalyst 25A and the second catalyst 25B will be described later. The first temperature sensor 28A detects the temperature of the exhaust gas EX flowing through the first branch pipe 22A. The second temperature sensor 289 detects the temperature of the exhaust gas EX flowing through the second branch pipe 22B. The first temperature sensor 28A may detect the temperature of the exhaust gas EX in the first catalyst 25 and the second temperature sensor 28B may detect the temperature of the exhaust gas EX in the second catalyst 25B.

The atmospheric pressure sensor 29 is a pressure sensor that detects an atmospheric pressure $P_{at}$. The processing unit 51 performs the exhaust gas processing method and obtains a pressure $P_{jn}$ (hereinafter may be referred to as a convergence portion pressure) at a portion 22J where the first exhaust gas purification unit 20A and the second exhaust gas purification unit 20B converge (hereinafter nay be referred to as a convergence portion). This is because the convergence portion pressure $P_{jn}$ is required to obtain the flow rates of the exhaust gas EX flowing through the first branch pipe 22A and the second branch pipe 22B, respectively. In the present embodiment, the processing unit 51 obtains the convergence portion pressure $P_{jn}$ by giving a total flow rate $Q_m$ of the exhaust gas EX obtained while the diesel engine 10 is operated, the temperature of the exhaust gas EX detected by the exhaust gas temperature sensor, and the atmospheric pressure $P_{at}$ detected by the atmospheric pressure sensor 29 to a relationship between the convergence portion pressure $P_{jn}$, the total flow rate $Q_m$ of the exhaust gas EX exhausted from the diesel engine 10, the temperature of the exhaust gas EX, and the atmospheric pressure $P_{at}$. The total flow rate $Q_m$ of the exhaust gas EX is obtained by an exhaust gas total flow rate detection unit while the diesel engine 10 is operated. The exhaust gas total flow rate detection unit will be described later. The aforementioned convergence portion 22J is a portion where a plurality of first exhaust gas passages converge, that is, a portion where the first branch pipe 22A and the second branch pipe 22B converge.

(First Exhaust Gas Purification Unit 20A and Second Exhaust Gas Purification Unit 20B)

In the embodiment, the first exhaust gas purification unit 20A and the second exhaust gas purification unit 20B, which are used as exhaust gas purification units, include a first DPF (Diesel Particulate Filter) 23A and a second DPF 23B, which are used as particulate filters, and the first catalyst 25A and the second catalyst 25B, which are used as reducing catalysts (hereinafter may be referred to as NOx reducing catalysts) that reduce NOx. In the embodiment, the exhaust gas processing device 20 mainly uses a technique which processes exhaust gas and which is called urea SCR that reduces NOx contained in the exhaust gas EX by using the NOx reducing catalyst as a selective catalyst and a reducing agent. However, the technique that processes the exhaust gas EX is not limited to this.

The temperature of the exhaust gas EX used in the exhaust gas processing method according to the embodiment is a temperature $T_{jn}$ (hereinafter may be referred to as a convergence portion temperature) of the exhaust gas EX at the convergence portion 22J. The convergence portion temperature Tjn may be detected by providing an exhaust gas temperature sensor at the convergence portion 22J. When the convergence portion temperature $T_{jn}$ is detected on the downstream side of the first DPF 23A and the second DPF 23B, the convergence portion temperature $T_{jn}$ does not so much affect the value of the convergence portion pressure $P_{jn}$ obtained by the processing unit 51. Therefore, in the embodiment, at least either one of the first temperature sensor 28A and the second temperature sensor 28B is used as an exhaust gas temperature sensor for obtaining the convergence portion temperature $T_{jn}$. The temperature of the exhaust gas EX detected by either one of the temperature sensors may be defined as the convergence portion temperature $T_{jn}$ or an average value of the temperatures of the exhaust gas EX detected by both temperature sensors may be defined as the convergence portion temperature $T_{jn}$.

The first catalyst 25A used as a NOx reducing catalyst is provided at the first branch pipe 22A and the second catalyst 25B is provided at the second branch pipe 22B. The first catalyst 25A and the second catalyst 25B reduce the NOx in the exhaust gas EX by using a reducing agent R. In other words, the first catalyst 25A and the second catalyst 25B are respectively provided to the first branch pipe 22A and the second branch pipe 22B which are used as first exhaust gas passages and reduce the NOx in the exhaust gas EX.

A necessary amount of reducing agent R is supplied in the first branch pipe 22A on the upstream side of the first catalyst 25A used as a NOx reducing catalyst and the second branch pipe 22B on the upstream side of the second catalyst 25B used as a NOx reducing catalyst by a reducing agent supply device 30. The reducing agent supply device 30 includes a reducing agent tank 31, a first pump 32A, a second pump 32B, a first injection device 33A, and a second injection device 33B. The control device 50 controls the first pump 32A, the second pump 32B, the first injection device 33A, and the second injection device 33B. The first injection device 33A injects the reducing agent R pressure-fed from he reducing agent tank 31 by the first pump 32A into the first branch pipe 22A. The second injection device 33B injects the reducing agent R pressure fed from the reducing agent tank 31 by the second pump 32B into the second branch pipe 22B.

In the embodiment, the reducing agent R is urea (more specifically, urea water). The reducing agent R supplied in the first branch pipe 22A and the second branch pipe 22B is decomposed by heat of the exhaust gas EX and changed into ammonia. In the first catalyst. 25A and the second catalyst 25B which are used as NOx reducing catalysts, the NOx and the ammonia cause a catalytic reaction and are converted into nitrogen and water. In this way, the exhaust gas processing device 20 converts the NOx contained in the exhaust gas EX into nitrogen and water by using selective catalyst reduction using urea as the reducing agent R, that is, by using the urea SCR.

The NOx reducing catalyst converts the NOx into nitrogen and water by using a reducing agent that reduces the NOx. As the NOx reducing catalyst, for example, a vanadium-based catalyst, a zeolite-based catalyst, or the like is used. The exhaust gas processing device 20 may include an oxidation catalyst (AMOX: Ammonia Oxidation Catalyst) for purifying ammonia on the downstream side of the first catalyst 25A and the second catalyst 25B in the flowing direction of the exhaust gas EX.

The first DPF 23A is provided on the upstream side of the first catalyst 25A used as a NOx reducing catalyst and the second DPF 23B is provided on the upstream side of the second catalyst 25B used as a NOx reducing catalyst. These DPFs remove soot (PM, the same hereinafter) contained in the exhaust gas EX. When the exhaust gas processing device 20 includes the first DPF 23A and the second DPF 23B, an oxidation catalyst (for example, DOC: Diesel Oxidation Catalyst) may be provided on the upstream side of the first DPF 23A and the second DPF 23B.

(Other Components Included in Exhaust Gas Processing Device 20)

In the embodiment, the exhaust gas processing device 20 includes a first pressure sensor 27A and a second pressure sensor 27E which are used as pressure sensors and a NOx detection sensor 15 as components in addition to the components described above. The first pressure sensor 27A is arranged on the upstream side of the first catalyst 25A used as a NOx reducing catalyst and the second pressure sensor 27B is arranged on the upstream side of the second catalyst 25B used as a NOx reducing catalyst. The first pressure sensor 27A detects pressure in the first branch pipe 22A used as a first exhaust gas pas sage on the upstream side of the first catalyst 25A. The second pressure sensor 27B detects pressure in the second branch pipe 22B used as a first exhaust gas passage on the upstream side of the second catalyst 25B.

The NOx detection sensor 15 detects the concentration of the NOx contained in the exhaust gas EX exhausted from the diesel engine 10. The concentration of the NOx contained in the exhaust gas EX does not vary before the exhaust gas EX passes through the first catalyst 25A and the second catalyst 25B which are used as NOx reducing catalysts if the operating condition of the diesel engine 10 is the same. Therefore, a position where the NOx detection sensor 15 is arranged is not limited to the exhaust pipe 21 used as an exhaust gas introduction passage. For example, the NOx detection sensor 15 may be arranged at the branch portion 21S or may be arranged at the first branch pipe 22A or the second branch pipe 228. Therefore, the freedom of arrangement of the NOx detection sensor 15 is relatively high.

In the embodiment, the NOx detection sensor 15 may be arranged on the downstream side of the exhaust port 16 of the diesel engine 10 and on the upstream side of the first catalyst 25A and the second catalyst 25B which are used as NOx reducing catalysts.

The intake air amount sensor 14, the first temperature sensor 28A, the second temperature sensor 28B, the atmospheric pressure sensor 29, the NOx detection sensor 15, the first pressure sensor 27A, and the second pressure sensor 27B, which are described above, are electrically connected to the control device 50. The control device 50 acquires detection values of these sensors to implement the exhaust gas processing method according to the embodiment. Next, the control device 50 will be described later.

(Control Device 50)

For example, a microcomputer unit is used as the control device 50. The control device 50 includes the processing unit 51 and a storage unit 52. The processing unit 51 is, for example, a CPU (Central Processing Unit). The storage unit 52 is, for example, RAM (Random Access Memory), ROM (Read. Only Memory), EPROM (Erasable Programmable Read Only Memory), or EEPROM (Electrically Erasable Programmable Read-Only Memory), or a combination of these.

The processing unit 51 performs the exhaust gas processing method according to the embodiment, and further performs various control on the diesel engine 10. The storage unit 52 stores a computer program for performing the aforementioned various control and information required for the various control. When the processing unit 51 performs the aforementioned various control, the processing unit 51 reads the aforementioned computer program from the storage unit 52 and executes instructions described in the computer program. In this case, the processing unit 51 reads the information required for the control from the storage unit 52 as needed and acquires information related to a state of the diesel engine 10 from various sensors such as the intake air amount sensor 14, the first temperature sensor 28A, the second temperature sensor 28B, and the atmospheric pressure sensor 29.

In the embodiment, the control device 50 acquires detection values of the intake air amount sensor 14, the first temperature sensor 26A, the second temperature sensor 28B, the atmospheric pressure sensor 29, the NOx detection sensor 15, the first pressure sensor 27A, the second pressure sensor 27B, and the like, and controls the amount of reducing agent R supplied to the first catalyst 25A and the second catalyst 25B at least based on the detection values. As an example, the control device 50 obtains the flow rate of the exhaust as EX flowing through the first branch pipe 22A on the upstream side of the first catalyst 25A and the second branch pipe 22B on the upstream side of the second catalyst 25B based on the detection values of the intake air amount sensor 14, the first temperature sensor 28A, the second temperature sensor 28B, the atmospheric pressure sensor 29, the first pressure sensor 27A, and the second pressure sensor 27B. Then, the control device 50 obtains the flow rate of NOx in the first branch pipe 22A and the second branch pipe 22E from the obtained flow rate of the exhaust gas EX in the first branch pipe 22A and the second branch pipe 22B and the concentration of NOx in the exhaust gas EX detected by the NOx detection sensor 15. Thereafter, the control device 50 obtains the amount of reducing agent R given to the first catalyst 25A and the second catalyst 25B from the obtained flow rate of NOx in the first branch pipe 22A and the second branch pipe 22B.

When obtaining the flow rate of the exhaust gas EX in the first branch pipe 22A and the second branch pipe 22B, the control device 50 obtains a flow rate ratio of the exhaust gas EX flowing through the first branch pipe 22A and the second branch pipe 22B based on the detection values of the first pressure sensor 27A and the second pressure sensor 27B and the convergence portion pressure $P_{jn}$. Subsequently, the control device 50 obtains the flow rate of the exhaust gas EX flowing through the first branch pipe 22A and the second branch pipe 22B based on the obtained flow rate ratio and the total flow rate $Q_m$ of the exhaust gas EX. The total flow rate $Q_m$ of the exhaust gas EX is the total flow rate of the exhaust gas EX exhausted from the diesel engine 10. The total flow rate $Q_m$ corresponds to the flow rate of the exhaust gas EX flowing through the exhaust pipe 21. In the embodiment, the total flow rate $Q_m$ of the exhaust gas EX is obtained by the exhaust eras total flow rate detection unit described above. In the embodiment, the control device 50 and the sensors such as the intake air amount sensor 14 correspond to the exhaust gas total flow rate detection unit.

The total flow rate of the exhaust gas EX can be obtained from, for example, the amount of air taken into the diesel engine 10 and the amount of fuel injected into the diesel engine 10. The amount of air taken into the diesel engine 10 can be detected by the intake air amount sensor 14. The amount of fuel injected into the diesel engine 10 is calculated from the operating condition of the diesel engine 10 by the control device 50 that controls the diesel engine 10.

It is preferable that the first pressure sensor 27A is arranged between the first DPF 23A and the first catalyst 25A and the second pressure sensor 27B is arranged between the second DPF 23B and the second catalyst 25B. The first DPF 23A and the second DPF 23B rectify the exhaust gas EX, so that the accuracy of detection of the first pressure sensor 27A and the second pressure sensor 27B is improved by the aforementioned arrangement.

The exhaust gas processing device 20 causes the passage of the exhaust gas EX to branch into a plurality of passages (in the embodiment, two passages) and processes the exhaust gas EX by the NOx reducing catalyst arranged in each passage in order to process the exhaust gas EX exhausted from the diesel engine 10 having a large displacement. The exhaust gas processing device 20 has to obtain accurate flow rates of the exhaust gas EX flowing through these passages in order to accurately supply an appropriate amount of reducing agent R to the first catalyst 25A and the second catalyst 25B included in the exhaust gas processing device 20. Therefore, when the exhaust gas processing device 20 processes the exhaust gas EX exhausted from the diesel engine 10, the exhaust gas processing device 20 performs the exhaust gas processing method according to the embodiment to improve the degree of accuracy when obtaining the flow rates of the exhaust gas EX flowing through a plurality of NOx reducing catalysts.

In the embodiment, when the diesel engine 10 has a turbocharger, a compressor of the turbocharger is arranged on the downstream side of the intake air amount sensor 14 illustrated in FIG. 1 (on the downstream side in a direction in which the air AI flows). The compressor compresses the air AI after its flow rate is measured by the intake air amount sensor 14. The flow rate of the air AI measured by the intake air amount sensor 14 is a mass flow rate. Therefore, even when the diesel engine 10 has a turbocharger, the measurement of the flow rate of the air AI taken into the diesel engine 10 is not affected. Therefore, the aforementioned calculation of the total flow rate $Q_m$ of the exhaust gas EX is not affected.

In the embodiment, the diesel engine 10 may include an EGR (Exhaust Gas Recirculation) device. The EGR device is a device that returns a part of the exhaust gas EX exhausted from the diesel engine 10 to an air intake side, more specifically, to the intake pipe 12. The EGR only returns a part of the exhaust gas EX exhausted from the diesel engine 10 to the air intake side, so that the total flow rate $Q_m$ of the exhaust gas EX does not change in the entire diesel engine 10. Therefore, even when the diesel engine 10 includes the EGR, the aforementioned calculation of the total flow rate $Q_m$ of the exhaust gas EX is not affected.

<Exhaust Gas Exhausted from Exhaust Gas Processing Device>

In the embodiment, the exhaust gas EX processed and exhausted by the exhaust gas processing device 20 is supplied to, for example, a heating pipe 101 included in a vessel 100 of a dump truck in order to heat the vessel 100. Therefore, the second exhaust gas passage 26 is connected to an inlet port 102 of the heating pipe 101. By such a structure, the exhaust gas Ex exhausted from the exhaust gas processing device 20 flows into the beating pipe 101 and heats the vessel 100 while flowing through the heating pipe 101. By doing so, soil and the like loaded in the vessel 100 smoothly drop from the vessel 100.

<Method of Obtaining Convergence Portion Pressure $P_{jn}$>

The exhaust gas processing device 20 causes the first branch pipe 22A and the second branch pipe 22B to converge at the convergence portion 22J and exhausts the exhaust gas EX from one second exhaust gas passage 26. It is necessary to obtain each flow rate of the exhaust gas EX flowing through the first branch pipe 22A and the second branch pipe 22B in order to control the amounts of reducing agents supplied to the first catalyst 25A provided in the first branch pipe 22A and the second catalyst 25B provided in the second branch pipe 22B and obtain the amounts of soot accumulated in the first DPF 23A and the second DPF 23B. In order to do that, it is necessary to know each pressure of the exhaust: gas EX flowing through the first branch pipe 22A and the second branch pipe 22B.

In a structure in which the first branch pipe 22A and the second branch pine 22B are converged at the convergence portion 22J and the exhaust gas EX is exhausted from one second exhaust gas passage 26, due to effects of pipe resistance at the convergence portion 22J, it is not possible to accurately obtain each pressure of the exhaust gas EX flowing through the first branch pipe 22A and the second branch pipe 22B, so that it is not possible to accurately obtain each flow rates of the exhaust gas EX.

In the embodiment, the heating pipe 101 of the vessel 100 is connected to the second exhaust gas passage 26. In this structure, it can be considered to reduce the pipe resistance by enlarging the heating pipe 101 on the downstream side of the convergence portion 22J in order to reduce the effects of the pipe resistance at the convergence portion 22. However, the heating pipe 101 is long and folded, so that when such a pipe is enlarged, it is necessary to secure a large space for the heating pipe 101. Therefore, it may cause a large design change of the heating pipe 101. Therefore, in practice, it is difficult to reduce the pipe resistance of the heating pipe 101.

Normally, the second exhaust gas passage 26 provided on the downstream side of the convergence portion 22J is connected to a noise suppressor and a pipe for guiding the exhaust gas EX to the second exhaust gas passage 26. Further, in the embodiment, the second exhaust gas passage 26 is connected to the heating pipe 101 of the vessel 100 illustrated in FIG. 1. The second exhaust gas passage 26, the heating pipe 101, and equipment such as a pipe or a noise suppressor connected on the downstream side of the second exhaust gas passage 26 are resistive elements of the flow of exhaust gas EX between the atmosphere and the first and the second branch pipes 22A and 22B. The convergence portion 22J is also a resistive element of the flow of exhaust gas EX between the atmosphere and the first and the second branch pipes 22A and 22B.

The flow rate of the exhaust gas EX at the convergence portion 22J is the flow rate of the exhaust gas EX exhausted from the first branch pipe 22A and the second branch pipe 22B to the atmosphere. This flow rate is the same as the total flow rate $Q_m$ of the exhaust gas EX exhausted from the diesel engine 10. Therefore, the total flow rate $Q_m$ can be represented by Formula (1) by using a differential pressure between the convergence portion pressure $P_{jn}$ and the atmospheric pressure $P_{at}$ and the convergence portion temperature $T_{jn}$. Here, c in Formula (1) is a constant. Further, $\sqrt{(P_{jn} \times (P_{jn} - P_{at}))/T_{jn}}$, which is a square root of the right side of Formula (1) is arbitrarily referred to as a pressure parameter in the embodiment, when the processing unit 51 of the control device 50 obtains the convergence portion pressure $P_{jn}$, a relationship between the convergence portion pressure $P_{jn}$, the total flow rate $Q_m$ of the exhaust gas, the convergence portion temperature $T_{jn}$, and the atmospheric pressure $P_{at}$ is obtained in advance by, for example, experiments.

$$Q_m = C \times \sqrt{\frac{P_{jn} \times (P_{jn} - P_{at})}{T_{jn}}} \qquad (1)$$

Figure 2:
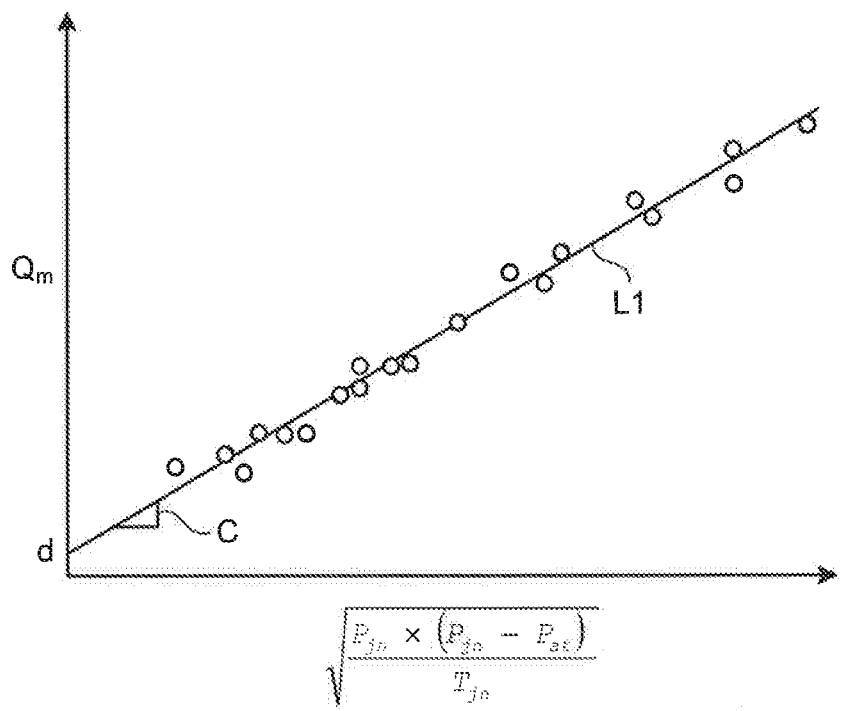
FIG. 2 is a diagram illustrating a relationship between a total flow rate of exhaust gas and a pressure parameter, which are obtained by using a convergence portion pressure, a total flow rate of the exhaust gas, a convergence portion temperature, and an atmospheric pressure, which are actually measured.

In FIG. 2 is a diagram illustrating a relationship between the total flow rate of the exhaust gas and the pressure parameter, which are obtained by using the convergence portion temperature, the total flow rate of the exhaust gas, the convergence portion temperature, and the atmospheric pressure, which are actually measured. FIG. 2 illustrates a relationship between the total flow rate $Q_m$ of the exhaust gas EX and the pressure parameter when the vertical axis represents the total flow rate $Q_m$ or the exhaust gas and the horizontal axis represents the pressure parameter obtained from the convergence portion pressure $P_{jn}$, the convergence portion temperature $T_{jn}$, and the atmospheric pressure $P_{at}$ at that time. A plurality of white circles illustrated in FIG. 2 are actual measurement values. A straight line L1 in FIG. 2 is an approximate straight line, which is approximated by a linear function as illustrated in Formula (1) in which the total flow rate $Q_m$ is a linear expression of the pressure parameter.

The relationship between the total flow rate $Q_m$ and the pressure parameter is theoretically a linear function with a slope c passing through the origin. However, when obtaining an approximate expression by using a least-squares method or the like from a flow rate $Q_{mA}$ and the pressure parameter, which are obtained by actually measuring the convergence portion pressure $P_{jn}$, the total flow rate $Q_m$ of the exhaust gas, the convergence portion temperature $T_{jn}$, and the atmospheric pressure $P_{at}$ by using the actual second exhaust gas passage 26, and the heating pipe 101 of the vessel 100 illustrated in FIG. 1 or the noise suppressor, a linear function that does not pass through the origin may be obtained as illustrated by the solid straight line L1 in FIG. 2. In this case, when the approximate expression based on the actual measurements is used, the degree of accuracy of the convergence portion pressure P is improved. In the present embodiment, an example is described in which the relationship between the flow rate $Q_{mA}$ and the pressure parameter is a linear function. However, the function representing the relationship between these is not limited to this. For example, in the embodiment, the relationship between these may be represented by various functions such as a quadratic function, a cubic function, an n-dimensional function (n is a real number), and an exponential function.

Formula (2) is a relational expression between the total flow rate $Q_m$ and the pressure parameter in a case in which the relational expression is represented by a linear function that does not pass through the origin based on the actual measurements. Here, c and d in Formula (2) are constants. The constant c is a slope of a linear function that passes through the origin or a slope of a linear function that does not pass through the origin as illustrated by the solid line L1 in FIG. 2. The constant d is a value of an intercept on a $Q_m$ axis of a linear function that passes through the origin or a linear function that does not pass through the origin as illustrated by the solid line L1. When the relationship between the total flow rate $Q_m$ and the pressure parameter is a linear function that passes through the origin, the intercept is 0, so that the constant d is 0. Therefore, the constants c and d can be determined from a linear function representing a straight line that passes through the origin or a linear function representing the straight line L1 as illustrated in FIG. 2. The constants c and d may be determined based on actual measurements or may be determined by a simulation, a theoretical calculation, or the like.

$$Q_m = C \times \sqrt{\frac{P_{jn} \times (P_{jn} - P_{at})}{T_{jn}}} + d \qquad (2)$$

When the actual measurement values in FIG. 2 are approximated by a linear expression in which the total flow rate $Q_m$ is the pressure parameter, Formula (2) is obtained. The straight line L1 in FIG. 2 corresponds to Formula (2). The constant c in Formula (2) is a slope of the straight line L1 in FIG, 2, and the constant d is a value of the intercept of the straight line L1 on the $Q_m$ axis in FIG. 2. The correlation coefficient of the approximation described above is 0.99, so that it is known that Formula (2) has a very high correlation with the actual measurement values.

When Formula (2) is solved for the convergence portion pressure $P_{jn}$, Formula (3) is obtained. Formula (3) represents a relationship between the convergence portion pressure $P_{jn}$, the total flow rate $Q_m$ of the exhaust gas EX, the convergence portion temperature $T_{jn}$, and the atmospheric pressure $P_{at}$. As illustrated in Formula (3), the convergence portion pressure $P_{jn}$ can be represented by a relational expression with the total flow rate $Q_m$ of the exhaust gas EX, the convergence portion temperature $T_{jn}$, and the atmospheric pressure $P_{at}$. The storage unit 52 in the control device 50 illustrated in FIG. 1 stores a map that describes, for example, Formula (3) itself or a relationship between the convergence portion pressure $P_{jn}$, the total flow rate $Q_m$ of the exhaust gas EX, the convergence portion temperature $T_{jn}$, and the atmospheric pressure $P_{at}$.

Figure 3:
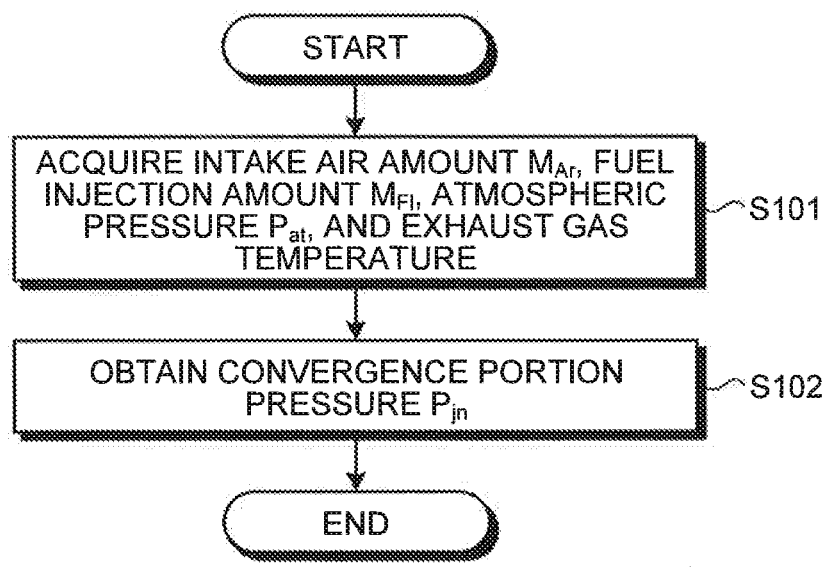
FIG. 3 is a flowchart illustrating an example of processing for obtaining the convergence portion pressure in an exhaust gas processing method according to the embodiment.

FIG. 3 is a flowchart illustrating an example of processing for obtaining the convergence portion pressure in the exhaust gas processing method according to the embodiment. When obtaining the convergence portion pressure $P_{jn}$, the processing unit 51 of the control device 50 acquires an intake air amount $M_{Ar}$ detected by the intake air amount sensor 14, a fuel injection amount $M_{FI}$ calculated by the control device 50 from the operating condition of the diesel engine 10, an exhaust gas temperature detected by the first temperature sensor 28A or the like, and the atmospheric pressure $P_{at}$ detected by the atmospheric pressure sensor 29 (step S101). The exhaust gas temperature corresponds to the convergence portion temperature $T_{jn}$. As the exhaust gas temperature, for example, a temperature $T_A$ or $T_B$ of the exhaust gas TX on the upstream side of the first catalyst 25A or the second catalyst 25B can be used. As the atmospheric pressure $P_{at}$, an average atmospheric pressure may be used as a constant besides the detection value detected by the atmospheric pressure sensor 29.

The total flow rate $Q_m$ of the exhaust gas TX can be obtained by a sum of the intake air amount $M_{Ar}$ of the diesel engine 10 detected by the intake air amount sensor 14 included in the diesel engine 10 and an amount of fuel. (fuel injection amount) $M_{Fl}$ (mass) per unit time (for example, per second), which is injected to the diesel engine 10 by the fuel injection device 11. The processing unit 51 obtains the total flow rate $Q_m$ of the exhaust gas EX from the intake air amount $M_{Ar}$ detected by the intake air amount sensor 14 and the fuel injection amount $M_{Fl}$ calculated by the control device 50. Alternatively, the processing unit 51 may obtain the total flow rate $Q_m$ of the exhaust gas EX by using an air-fuel ratio. For example, the processing unit 51 may obtain the fuel injection amount $M_{Fl}$ from the intake air amount $M_{Ar}$ of the diesel engine 10 detected by the intake air amount sensor 14 and the air fuel ratio and obtain the total flow rate $Q_m$ of the exhaust gas EX from the intake air amount $M_{Are}$ and the fuel injection amount $M_{Fl}$ obtained from the intake air amount $M_{Ar}$ and the air-fuel ratio.

Further, the processing unit 51 may obtain the intake air amount $M_{Ar}$ of the diesel engine 10 from the fuel injection amount $M_{Fl}$ and the air-fuel ratio and obtain the total flow rate $Q_m$ of the exhaust gas EX from the fuel injection, amount $M_{Fl}$ and the intake air amount. $M_{Ar}$ obtained from the fuel injection amount $M_{Fl}$ and the air-fuel ratio. In these examples, as the air-fuel ratio, a typical value of air-fuel ratio in the operating contagion of the diesel engine 10 can be used. In addition to these examples, further, the processing unit 51 may obtain the intake air amount $M_{Ar}$ from volumetric efficiency of the diesel engine 10 and temperature, pressure, and flow rate of the intake air, and obtain the total flow rate $Q_m$ of the exhaust gas EX from the obtained intake air amount $M_{Ar}$ and the fuel injection amount $M_{Fl}$.

As described above, the total flow rate $Q_m$ of the exhaust gas EX can be obtained by a plurality of methods. In any method, the processing unit 51 of the control device 50 acquires a detection value of a sensor such as the intake air amount sensor 14 and obtains the total flow rate $Q_m$ of the exhaust gas EX by performing a certain calculation on the aforementioned detection value. Therefore, in the embodiment, the processing unit 51 of the control device 50 and a sensor such as the intake air amount sensor 14 correspond to the exhaust gas total flow rate detection unit that obtains the total flow rate of the exhaust gas EX exhausted from the diesel engine 10.

Next, the processing unit 51 proceeds to step S102 and reads Formula (3) or a map stored in the storage unit 52. Then, the processing unit 51 gives the obtained total flow rate $Q_m$ of the exhaust gas EX and the acquired exhaust gas temperature and atmospheric pressure $P_{at}$ to Formula (3) or the map that are read. The exhaust gas temperature is given to Formula (3) or the map as the convergence portion temperature $T_{jn}$. Then, Formula (3) or the map calculates the convergence portion pressure $P_{jn}$, so that the processing unit. 51 can obtain the convergence portion pressure $P_{jn}$ (step S102).

$$P_{jn} = \frac{P_{at} + \sqrt{P_{at}^2 + 4 \times \left(\frac{Q_m - d}{C}\right)^2 \times T_{jn}}}{2} \quad (3)$$

In this way, the exhaust gas processing device 20 obtains in advance the relational expression between the convergence portion pressure $PT_{jn}$, the total flow rate $Q_m$ of the exhaust gas EX, the convergence portion temperature $T_{jn}$, and the atmospheric pressure $P_{at}$ by experiments and the like, and obtains the convergence portion pressure $PT_{jn}$ by using the relational expression. Therefore, the exhaust gas processing device 20 can obtain the convergence portion pressure $P_{jn}$ required to obtain the flow rates of the exhaust gas EX flowing through the first branch pipe 22A and the second branch pipe 22B, respectively, in a simple manner with a high degree of accuracy without using a pressure sensor. As a result, the exhaust gas processing device 20 can obtain the flow rates of the exhaust gas EX flowing through the first branch pipe 22A and the second branch pipe 22B, respectively, in a simple manner with a high degree of accuracy. Further, the exhaust gas processing device 20 does not need a pressure sensor that detects the convergence portion pressure so that it is possible to suppress increase in the cost. Next, in the exhaust gas processing method according to the embodiment, a method of obtaining each flow rate of the exhaust gas EX flowing through the first branch pipe 22A and the second branch pipe 22B will be described.

<First Example of Method of Obtaining Flow Rate in Each Branch Pipe>

In the exhaust gas processing method according to the embodiment, the flow rate in each branch pipe can be obtained from at least the convergence portion pressure $P_{jn}$, a pressure of the exhaust gas EX on the upstream side of the first catalyst 25A provided in the first branch pipe 22A, and a pressure of the exhaust gas EX on the upstream side of the second catalyst 25B provided in the second branch pipe 22B. At this time, it is preferable to actually measure and use a measured temperature of the exhaust gas EX on the upstream side of the first catalyst 25A provided in the first branch pipe 22A and a temperature of the exhaust gas EX on the upstream side of the second catalyst 25B provided in the second branch pipe 22B, because it is possible to more accurately obtain the flow rate in each branch pipe by actually measuring the temperatures.

The first catalyst 25A and the second catalyst 25B are, for example, a carrier which has a plurality of passages where fluid flows and which carries a NOx reducing catalyst. Therefore, the first catalyst 25A and the second catalyst 25B included in the exhaust gas processing device 20 become resistive elements when the exhaust gas EX flows. Therefore, the first catalyst 25A and the second catalyst 25B can be regarded as a resistive element of the first branch pipe 22A and the second branch pipe 22B, respectively. By doing this, a flow rate $Q_{mA}$ (may be referred to as a first flow rate) of the exhaust gas EX flowing through the first catalyst 25A and a flow rate $Q_{mB}$ (may be referred to as a second flow rate) of the exhaust gas EX flowing through the second catalyst 25B can be represented by Formula (4) and Formula (5), respectively. Both of the first flow rate $Q_{mA}$ and the second flow rate $Q_{mB}$ are a mass flow rate. In the description below, $\sqrt{(P_{Au} \times (P_{Au} - P_{Ad})/T_A)}$ and $\sqrt{(P_{Bu} \times (P_{Bu} - P_{Bd})/T_B)}$, which are a square root of the right side of Formula (4) and Formula (5), are arbitrarily referred to as a pressure parameter.

$$Q_{mA} = k \times \sqrt{\frac{P_{Au} \times (P_{Au} - P_{Ad})}{T_A}} \quad (4)$$

$$Q_{mB} = k \times \sqrt{\frac{P_{Bu} \times (P_{Bu} - P_{Bd})}{T_B}} \quad (5)$$

$P_{Au}$ is a detection value of the first pressure sensor 27A and is a pressure of the exhaust gas EX flowing through the first branch pipe 22A on the upstream side of the first catalyst 25A and is a detection value of the second pressure sensor 27B and is a pressure of the exhaust gas EX flowing through the second branch pipe 22B on the upstream side of the second catalyst 25B. Both of these are an absolute pressure. $P_{Ad}$ is a pressure of the exhaust gas EX flowing through he first branch pipe 22A on the downstream side of the first catalyst 23A and $P_{Bd}$ is a pressure of the exhaust gas EX flowing through the second branch pipe 22B on the downstream side of the second catalyst 25B. $P_{Ad}$ and $P_{Bd}$ have the same value as that of the convergence portion pressure $P_{jn}$.

Here, k is a constant and is $a \times C \times A \times \sqrt{(R)}$. Here, a is a constant, C is a flow rate coefficient of the first catalyst 25A or the second catalyst 25B, A is a gross-sectional area (may be referred to as a passage area) of a passage through which the exhaust gas EX flows in the first catalyst 25A or the second catalyst 25B, and R is a gas constant. In Formula (4) and Formula (5) illustrated above, k is regarded as the same by assuming that the first catalyst 25A and the second catalyst 25B are the same. However, the constant k may be individually determined for each catalyst from the flow rate coefficient and the passage area of each catalyst. Further, k may be determined from a, C, A, and R by using the above formula or may be determined based on actual measurements as described below.

$T_A$ is a temperature of the exhaust gas EX on the upstream side of the first catalyst 25A and is a temperature (may be referred to as a first temperature) of the exhaust gas EX immediately before the exhaust gas EX enters the first catalyst 25A. $T_B$ is a temperature of the exhaust gas EX on the upstream side of the second catalyst 25B and is a temperature (may be referred to as a second temperature) of the exhaust gas EX immediately before the exhaust gas EX enters the second catalyst 25B. The exhaust gas processing device 20 includes the first temperature sensor 28A and the second temperature sensor 28B, so that detection values of the first temperature sensor 28A and the second temperature sensor 28B can be determined as the temperatures $T_A$ and $T_B$. Further, for example, the temperatures $T_A$ and $T_B$ may be estimated from a detection value of an exhaust gas temperature sensor included in the diesel engine 10. In this case, the temperatures $T_B$ and $T_B$ can be estimated by correcting the detection value of the exhaust gas temperature sensor based on a heat radiation amount or the like of the first branch pipe 22A, the second branch pipe 22B, the first DPF 23A, and the second DPF 23B. In this case, the temperatures $T_A$ and $T_B$ may be regarded as the same.

As described above, the first catalyst 25A and the second catalyst 25B can be regarded as a resistive element of the first branch pipe 22A and the second branch pipe 22B, respectively. Therefore, the exhaust gas processing device 20 can reliably detect the pressure of the exhaust gas EX flowing through the first branch pipe 22A and the pressure of the exhaust gas EX flowing through the second branch pipe 22B, more specifically, the pressure of the exhaust gas EX flowing through the first branch pipe 22A on the upstream side of the first catalyst 25A and the pressure of the exhaust gas EX flowing through the second branch pipe 225 on the upstream side of the second catalyst 25B, by the first pressure sensor 27A and a second pressure sensor 27B.

In other words, the first catalyst 25A is provided as a resistive element to fluid on the downstream side of the first pressure sensor 27A and the second catalyst 25B is provided as a resistive element to fluid on the downstream side of the second pressure sensor 27B, so that the exhaust gas processing device 20 can secure the pressure and a pressure variation of the exhaust gas EX on the upstream side or the first catalyst 25A and the second catalyst 25B. Therefore, the exhaust gas processing device 20 can measure the pressure of the exhaust gas EX in a state in which the pressure of the exhaust as EX is relatively high, so that the exhaust gas processing device 20 can suppress degradation in accuracy when measuring the pressure of the exhaust gas EX, which is used to obtain the first flow rate $Q_{mA}$ and the second flow rate $Q_{mB}$, that is, the pressure of the exhaust gas EX flowing through the first branch pipe 22A and the pressure of the exhaust gas EX flowing through the second branch pipe 22B. As a result, the exhaust gas processing device 20 can improve accuracy when obtaining the first flow rate $Q_{mA}$ and the second flow rate $Q_{mB}$ by using at least the pressure of the exhaust gas EX on the upstream side of the first catalyst 25A and the second catalyst 25B. Further, the exhaust gas processing device 20 can accurately supply an appropriate amount of reducing agent to the first catalyst 25A and the second catalyst 25B.

Figure 4:
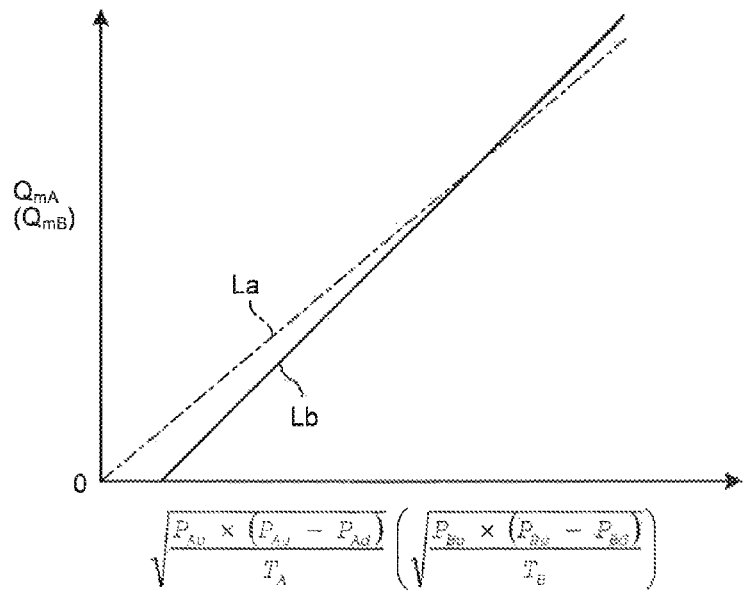
FIG. 4 is a diagram illustrating a relationship between a flow rate and a pressure parameter in a first reducing catalyst.

FIG. 4 is a diagram illustrating a relationship between a flow rate and a pressure parameter in a first reducing catalyst. A straight line La of an alternate long and short dash line in FIG. 4 represents a relationship between a flow rate $Q_{mA}$ ($Q_{mB}$) shown in Formula (4) and a pressure parameter $\sqrt{(P_{Au} \times (P_{Au}-P_{Ad})/T_A)}$ (or $\sqrt{(P_{Bu} \times (P_{Bu}-P_{Bd})/T_B)}$). The relationship between the flow rate and the pressure parameter is theoretically a linear function with a slope k passing through the origin as illustrated by the straight line La. However, for the first catalyst 25A and the second catalyst 25B, when obtaining an approximate expression by using a least-squares method or the like from a result of actually measuring the flow rate $Q_{mA}$ and the pressure parameter, a linear function that does not pass through the origin may be obtained as illustrated by the solid straight line Lb in FIG. 4. In this case, when the approximate expression based on the actual measurements is used, the degree of accuracy of the first flow rate $Q_{mA}$ and the second flow rate $Q_{mB}$ is improved. In the present embodiment, an example is described in which the relationship between the flow rate $Q_{mA}$ and the pressure parameter is a linear function. However, the function representing the relationship between these is not limited to this. For example, in the embodiment, the relationship between these may be represented by various functions such as a quadratic function, a cubic function, an n-dimensional function (n is a real number), and an exponential function.

Formula (6) and Formula (7) illustrate formulae of the first flow rate $Q_{mA}$ and the second flow rate $Q_{mB}$ in a case in which they are represented by a linear function that does not pass through the origin based on the actual measurements. Here, A1 and A2 in Formula (6) and B1 and B2 in Formula (7) are constants. The constant A1 is a slope of a linear function that passes through the origin as illustrated by, for example, the straiaht line La illustrated by the alternate long and short dash line in FIG. 4, or a slope of a linear function that does not pass through the origin as illustrated by the solid straight line Lb. The constant A2 is a value of an intercept on a $Q_{mA}$ axis of a linear function that passes through the origin as illustrated by the straight line La of an alternate long and short dash line or a linear function that does not bass through the origin as illustrated by the solid straight line Lb. When the relationship between the flow rate $Q_{mA}$ and the pressure parameter is a linear function that passes through the origin as illustrated by the straight line La of an alternate long and short dash line, the intercept is 0, so that the constant A2 is 0. Therefore, the constants A1 and A2 can be determined from a linear function representing the straight line La or the straight line Lb as illustrated in FIG. 4. The same as for the constants A1 and A2 goes for the constants B1 and B2. In this way, the constants A1, A2, B1, and B2 may be determined based on actual, measurements or may he determined by a simulation, a theoretical calculation, or the like.

$$Q_{mA} = A1 \times \sqrt{\frac{P_{Au} \times (P_{Au} - P_{Ad})}{T_A}} + A2 \quad (6)$$

$$Q_{mB} = B1 \times \sqrt{\frac{P_{Bu} \times (P_{Bu} - P_{Bd})}{T_B}} + B2 \quad (7)$$

When the first flow rate $Q_{mA}$ and the second flow rate $Q_{mB}$ are obtained from Formula (4) and Formula (5) or Formula (6) and Formula (7), a flow rate $Q_{mAN}$ of NOx flowing through the first catalyst 25A (may be referred to as a first NOx flow rate) and a flow rate $Q_{mBN}$ of NOx flowing through the second catalyst 25B (may be referred to as a second NOx flow rate) are obtained from Formula (8) and Formula (9) based on the concentration of NOx contained in the exhaust gas EX exhausted from the diesel engine 10. In these Formulae, $C_N$ is the concentration of NOx contained in the exhaust gas EX exhausted from the diesel engine 10, $m_N$ is the mass of NOx per mol, and $m_E$ is the mass of the exhaust gas EX per mol. Both of $Q_{mAN}$ and $Q_{mBN}$ are a mass flow rate.

$$Q_{mAN} = Q_{mA} \times C_N \times \frac{m_N}{m_E} \quad (8)$$

$$Q_{mBN} = Q_{mB} \times C_N \times \frac{m_N}{m_E} \quad (9)$$

The amount of NOx flowing through the first catalyst 25A and the second catalyst 25B is known from Formula (8) and Formula (9). Therefore, it is possible to obtain the amount of reducing agent R required to convert all the NOx flowing through the first catalyst 25A and the second catalyst 25B into nitrogen and water. The amount of required reducing agent R described above can be represented by Formula (10) and Formula (11). In these Formulae, $Q_{mAur}$ is the amount of reducing agent R required for the first catalyst 25A, and $Q_{mBur}$ is the amount of reducing agent R required for the second catalyst 25B. Further, β is ANR (Ammonia to NOx Ratio) and γ is a mass ratio between the reducing agent R (in the embodiment, urea water) and NOx when ANR=1 is established.

$$Q_{mAur} = \beta \times \gamma \times Q_{mAN} \quad (10)$$

$$Q_{mBur} = \beta \times \gamma \times Q_{mBN} \quad (11)$$

A first example of the exhaust gas processing method according to the embodiment can improve accuracy when measuring the first flow rate $Q_{mA}$ and the second flow rate $Q_{mB}$ by using at least the pressures of the first branch pipe 22A and the second branch pipe 22B on the upstream side of the first catalyst 25A and the second catalyst 25B. Therefore, the first example can accurately obtain the flow rate of NOx flowing through the first catalyst 25A and the second catalyst 25B, so that the first example can accurately supply an appropriate amount of reducing agent A to the first catalyst 25A and the second catalyst 25B by using the acquired amount of the flow rate of NOx.

<Second Example of Method of Obtaining Flow Rate in Each Branch Pipe>

In the exhaust gas processing method according to the embodiment, a second example of the method of obtaining the flow rate in each branch pipe is similar to the first example described above. However, the second example is different from the first example in that the second example obtains the flow rate in each branch pipe by using a flow rate ratio $Q_{mA}/Q_{mB}$ that is a ratio between the first flow rate $Q_{mA}$ and the second flow rate $Q_{mB}$ which are obtained based on the pressures of the first branch pipe 22A and the second branch pipe 22B on the upstream side of the first catalyst 25A and the second catalyst 25B and the total flow rate $Q_m$ of the exhaust gas EX exhausted from the diesel engine 10.

The flow rate ratio α obtained based on the pressures of the first branch pipe 22A and the second branch pipe 22B on the upstream side of the first catalyst 25A and the second catalyst 25B is represented by Formula (12). The first flow rate $Q_{mA}$ and the second flow rate $Q_{mB}$ in Formula (12) can be obtained respectively from Formula (4) and Formula (5) described above. When the first temperature $T_A$ and the second temperature may be regarded as the same, $T_B/T_A$ in Formula (12) can be regarded as 1, so that Formula (12) becomes Formula (13). The case in which the first temperature $T_A$ and the second temperature $T_B$ can be regarded as the same is, for example, a case in which one is within ±5% of the other. Formula (14) shows the flow rate ratio α between the first flow rate $Q_{mA}$ obtained from Formula (6) described above and the second flow rate $Q_{mB}$ obtained from Formula (7) described above.

$$\alpha = \frac{Q_{mA}}{Q_{mB}} = \sqrt{\frac{P_{Au} \times (P_{Au} - P_{Ad}) \times T_B}{P_{Bu} \times (P_{Bu} - P_{Bd}) \times T_A}} \quad (12)$$

$$\alpha = \sqrt{\frac{P_{Au} \times (P_{Au} - P_{Ad})}{P_{Bu} \times (P_{Bu} - P_{Bd})}} \quad (13)$$

$$\alpha = \frac{Q_{mA}}{Q_{mB}} = \frac{A1 \times \sqrt{\frac{P_{Au} \times (P_{Au} - P_{Ad})}{T_A}} + A2}{B1 \times \sqrt{\frac{P_{Bu} \times (P_{Bu} - P_{Bd})}{T_B}} + B2} \quad (14)$$

When the exhaust gas processing device 20 includes the first temperature sensor 28A and the second temperature sensor 28B, the flow rate ratio α is obtained by using Formula (12) or Formula (14). When the first temperature sensor 28A and the second temperature sensor 28B are used, if either one cannot detect a correct temperature, the flow rate ratio α may be obtained by using one temperature sensor that operates correctly assuming that the exhaust gas EX on the side of the first catalyst 25A and the exhaust gas EX on the side of the second catalyst 25B are the same temperature. By doing so, the reliability is improved. When one of both temperature sensors cannot detect a correct temperature, if the exhaust gas EX on the side of the first catalyst 25A and the exhaust gas EX on the side of the second catalyst 25B are assumed to have the same temperature, Formula (12) becomes Formula (13).

The total flow rate $Q_m$ of the exhaust gas EX exhausted from the diesel engine 10 is a total flow rate (mass flow rate) of the exhaust gas EX exhausted from the exhaust port 16 of the diesel engine 10. When using the aforementioned flow rate ratio α and the total flow rate $Q_m$ of the exhaust gas EX, a first flow rate $Q_{mA}'$ that is a flow rate of exhaust gas EX flowing through the first catalyst 25A and a second flow rate $Q_{mB}'$ that is a flow rate of exhaust gas EX flowing through the second catalyst 25B are represented as Formula (15) and Formula (16), respectively. The first flow rate $Q_{mA}'$ and the second flow rate $Q_{mB}'$ which are obtained by using the flow rate ratio α are added with "'" in order to be distinguished from the first flow rate $Q_{mA}$ and the second flow rate $Q_{mB}$ which are obtained based on only the pressures $P_{Au}$ and $P_{Bu}$ on the upstream side of the first catalyst 25A and the second catalyst 25B.

$$Q'_{mA} = \frac{\alpha}{\alpha+1} \times Q_m \qquad (15)$$

$$Q'_{mB} = \frac{1}{\alpha+1} \times Q_m \qquad (16)$$

When the first flow rate $Q_{mA}'$ and the second flow rate $Q_{mB}'$ are obtained from Formula (15) and Formula (16), it is possible to obtain the first NOx flow rate $Q_{mAN}$ and the second NOx flow rate $Q_{mBN}$ by giving the first flow rate $Q_{mA}'$ and the second flow rate $Q_{mB}'$ to $Q_{mA}$ and $Q_{mB}$, respectively, in Formula (8) and Formula (9) described above. When the flow rate ratio α is not used, the sum of the first flow rate $Q_{mA}$ and the second flow rate $Q_{mB}$ may not be the total flow rate $Q_m$ of the exhaust gas EX due to measurement errors and the like of the first pressure sensor 27A and the second pressure sensor 27S. As known from Formula (15) and Formula (16), when the flow rate ratio α is used, the sum of the first flow rate $Q_{mA}'$ and the second flow rate $Q_{mB}'$ becomes the total flow rate $Q_m$ of the exhaust gas EX. Therefore, it is possible to more accurately obtain the flow rates of NOx flowing through the first catalyst 25A and the second catalyst 25B by using the first flow rate $Q_{mA}'$ and the second flow rate $Q_{mB}'$ obtained based on the flow rate ratio α. As a result, it is possible to more accurately supply an appropriate amount of reducing agent R to the first catalyst 25A and the second catalyst 25B in the second example.

<Processing Flow of Exhaust Gas Processing Method>

Figure 5:
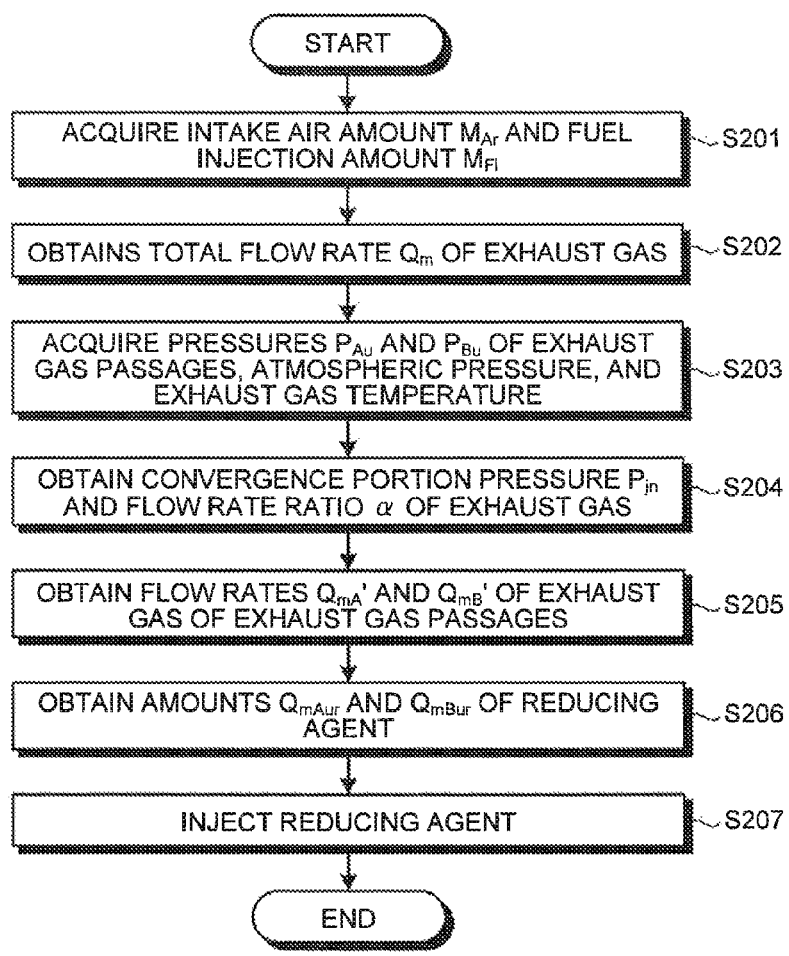
FIG. 5 is a processing flow diagram of the exhaust gas processing method according to the embodiment.

FIG. 5 is a processing flow diagram of the exhaust gas processing method according to the embodiment. An example of the processing flow of the exhaust gas processing method according to the embodiment will be described with reference to FIG. 5. In this example, the second example of the method of obtaining the flow rate in each branch pipe is used. In the description, below, the flow rate of a fluid, that is, the amount of intake air, the flow rate of the exhaust gas EX, and the like, are a mass flow rate. When executing the exhaust gas processing method according to the embodiment, in step S201, the control device 50 illustrated in FIG. 1 acquires a detection value of the intake air amount sensor 14, that is, the intake air amount $M_{Ar}$ of the diesel engine 10, and the fuel injection amount $M_{Fl}$ of the fuel injection device 11. When the control device 50 controls the diesel engine 10, the control device 50 calculates the fuel injection amount $M_{Fl}$ according to the operating condition, so that the control device 50 acquires a result of the calculation in step S201. The intake air amount $M_{Ar}$ and the fuel injection amount $M_{Fl}$ are inputted into the processing unit 51 of the control device 50 (see FIG. 1).

Next, in step S202, the control device 50 obtains the total flow rate $Q_m$ of the exhaust gas EX from the intake air amount $M_{Ar}$ and the fuel injection amount $M_{Fl}$ acquired in step S201. In the present example, the control device 50 obtains the total flow rate $Q_m$ of the exhaust gas EX by summing the intake air amount $M_{Ar}$ and the fuel injection amount $M_{Fl}$. The total flow rate $Q_m$ of the exhaust gas EX is outputted from the processing unit 51.

Next, in step S203, the control device 50 acquires the pressure of each branch passage, the atmospheric pressure $P_{at}$, and the exhaust gas temperature, which are required to obtain the pressure of the exhaust gas EX flowing through each branch passage of the exhaust gas processing device 20 illustrated in FIG. 1 and the convergence portion pressure $P_{jn}$. In the present example, as the pressure of each branch passage, the pressures of the first branch pipe 22A and the second branch pipe 22B illustrated in FIG. 1 are acquired. Specifically, the acquired pressures are the pressures $P_{Au}$ and $P_{Bu}$ of the exhaust gas EX on the upstream side of the first catalyst 25A and the second catalyst 25B illustrated in FIG. 1. The processing unit 51 of the control device 50 acquires the pressures $P_{Au}$ and $P_{Bu}$ of the exhaust gas EX on the upstream side of the first catalyst 25A and the second catalyst 25B from the first pressure sensor 27A and the second pressure sensor 27B illustrated in FIG. 1. The processing unit 51 acquires the atmospheric pressure $P_{at}$ from the atmospheric pressure sensor 29. Further, the processing unit 51 uses a temperature acquired from at least one of the first temperature sensor 28A and the second temperature sensor 28B as the exhaust gas temperature. As described above, the exhaust gas temperature corresponds to the convergence portion temperature $T_{jn}$. The pressures $P_{Au}$ and $P_{Bu}$, the atmospheric pressure $P_{at}$, and the exhaust gas temperature are inputted into the processing unit 51.

Next, in step S204, the processing unit 51 obtains the convergence portion pressure $P_{jn}$, and the flow rate ratio α of the exhaust gas EX. As described above, the convergence portion pressure $P_{jn}$ is obtained from the total flow rate $Q_m$ of the exhaust gas EX, the exhaust gas temperature, and the atmospheric pressure $P_{at}$. Further, the processing unit 51 obtains the flow rate ratio α by giving the pressures $P_{Au}$ and $P_{Bu}$ and the obtained convergence portion pressure $P_{jn}$ to one of Formulae (12), (13), and (14). The flow rate ratio α is outputted from the processing, unit 51. As known from Formula (12), Formula (13), and Formula (14), the flow rate ratio α includes a differential pressure $\Delta P_A(P_{Au}-P_{Ad})$ and a differential pressure $\Delta P_B$ $(P_{Bu}-P_{Bd})$. In the present example, when obtaining the differential pressures $\Delta P_A$ and all the pressures $P_{Au}$ and $P_{Bu}$ are measured. The convergence portion pressure $P_{jn}$ is obtained from Formula (2) having high correlation with a value obtained from an actual measurement value, so that an error from an actual value is very small. Therefore, even when the pressures $P_{Au}$ and $P_{Bu}$ of the exhaust gas EX on the upstream side of the first branch pipe 22A and the second branch pipe 22B are low, it is possible to suppress degradation of accuracy of the flow rate ratio α.

When Formula (12) and Formula (14) are used, the control device 50 obtains the temperatures $T_A$ and $T_B$ of the exhaust gas EX on the upstream side of the first catalyst 25A and the second catalyst 25b based on detection values of the first temperature sensor 28A and the second temperature sensor 28B illustrated in FIG. 1.

Alternatively, the control device 50 may estimate the temperature of the exhaust gas EX from the operating condition such as load and rotation speed of the diesel engine 10 and determine obtained estimation values as the temperatures $T_A$ and $T_B$. In the present example, the total flow rate $Q_m$ of the exhaust gas EX is obtained in step S202. However, the total flow rate $Q_m$ of the exhaust gas EX may be obtained before step S204, that is, before the convergence portion pressure $P_{jn}$ is obtained.

After the flow rate ratio α is obtained, in step S205, the processing unit 51 obtains the first flow rate $Q_{mA}'$ and the second flow rate $Q_{mB}'$ as the flow rates of each branch passage of the exhaust gas processing device 10 by giving the flow rate ratio α obtained in step S204 and the total flow rate $Q_m$ of the exhaust gas EX obtained in step S101 to Formula (15) and Formula (16). The first flow rate $Q_{mA}'$ and the second flow rate $Q_{mB}'$ are outputted from the processing unit 51.

Next, in step S206, the processing unit 51 obtains the amounts of reducing agent R supplied to the first catalyst 25A and the second catalyst 25B. When obtaining the amount of reducing agent R, the processing unit 51 gives the first flow rate $Q_{mA}'$ and the second flow rate $Q_{mB}'$ to Formula (8) and Formula (9) and obtains the first NOx flow rate $Q_{mAN}$ and the second NOx flow rate $Q_{mBN}$. Next, the processing unit 51 gives the obtained first NOx flow rate $Q_{mAN}$ and second NOx flow rate $Q_{mBN}$ to Formula (10) and Formula (11) and obtains the amount $Q_{mAur}$ of reducing agent R supplied to the first catalyst 25A and the amount $Q_{mBur}$ of reducing agent R supplied to the second catalyst 25B. The amount $Q_{mAur}$ of reducing agent R and the amount $Q_{mBur}$ of reducing agent R are outputted from the processing unit 51.

After the amounts $Q_{mAur}$ and $Q_{mBur}$ of reducing agent R are obtained, in step S207, the processing unit 51 injects the reducing agent R, the amounts of which are obtained in step S206, to the first catalyst 25A and the second catalyst 25B. Specifically, the first injection device 33A illustrated in FIG. 1 injects the reducing agent R pressure-fed from the reducing agent tank 31 by the first pump 32A into the first branch pipe 22A, and the second injection device 33B injects the reducing agent R pressure-fed from the reducing agent tank 31 by the second pump 32B into the second branch pipe 22B. After the reducing agent A is injected, steps S201 to S207 are repeatedly performed while the diesel engine 10 is being operated.

Formula (12), Formula (15), Formula (16), and the like, which are required to perform the exhaust gas processing method according to the embodiment, are stored in the storage unit 52 of the control device 50. When performing the exhaust gas processing method according to the embodiment, the processing unit 51 of the control device 50 reads these Formulae from the storage unit 52 and performs calculation.

As described above, in the embodiment, the flow rate of the exhaust gas EX flowing through each branch passage is obtained based on the pressure in each branch passage, so that it is possible to obtain the flow rate of the exhaust gas EX flowing through each branch passage and the flow rate of NOx flowing through each branch passage with a high degree of accuracy. As a result, in the embodiment, it is possible to accurately supply an appropriate amount of reducing agent R to the NOx reducing catalyst provided in each branch passage, so that it is possible to reliably convert NOx in the exhaust gas EX into nitrogen and water and suppress generation of ammonia that is not used for conversion of NOx.

In the embodiment, the flow rate of the exhaust gas EX flowing through each branch passage is obtained based on the pressure in each branch passage. Therefore, even when the sizes and the specifications of the branch passages or the NOx reducing catalysts are different from each other, or even when the lengths, the inside diameters, the routes, the curvatures, and the like of the branch passages are different from each other, it is possible to obtain the flow rate of the exhaust gas EX flowing through each branch passage and the flow rate of NOx flowing through each branch passage with a high degree of accuracy. As a result, in the embodiment, it is possible to accurately supply an appropriate amount of reducing agent R to each NOx reducing catalyst, so that it is possible to reliably convert NOx in the exhaust gas EX into nitrogen and water and suppress generation of ammonia even when the specifications of the branch passages are different from each other.

In the embodiment, it is possible to obtain the flow rate of the exhaust gas EX flowing through each NOx reducing catalyst by arranging one pressure sensor on the upstream side of each NOx reducing catalyst. Therefore, it is possible to simplify the structure of the exhaust gas processing device 20 and reduce the manufacturing cost. In the embodiment, the flow rate ratio $\alpha$ of the exhaust gas EX flowing through each branch passage is obtained based on the pressure in each branch passage. By using the obtained flow rate ratio $\alpha$, it is possible to obtain the flow rate of the exhaust gas Ex flowing through each branch passage and the flow rate of NOx flowing through each branch passage with a higher degree of accuracy.

In the embodiment, the total flow rate $Q_m$ of the exhaust gas EX is obtained from the intake air amount $M_{Ar}$ of the diesel engine 10 and the fuel injection amount $M_{Fl}$ to the diesel engine 10. These are information necessarily used to control the diesel engine 10 when operating the diesel engine 10. Therefore, it is possible to relatively easily obtain the total flow rate $Q_m$ of the exhaust gas EX by using these. The existing information is used, so that the embodiment can be easily applied to various diesel engines 10 and their exhaust gas processing devices 20. Therefore, the embodiment has an advantage of high versatility.

In the embodiment, a temperature sensor that detects the temperature of the exhaust gas EX flowing through each branch passage may be provided and the flow rate of the exhaust gas EX may be obtained by further using the temperature of the exhaust gas EX detected by the temperature sensor. By doing this, it is possible to obtain the flow rate of the exhaust gas EX flowing through each branch passage and the flow rate of NOx flowing through each branch passage with a higher degree of accuracy.

In the embodiment, a particulate filter may be provided on the upstream side of each NOx reducing catalyst and a pressure sensor may be arranged between each pair of particulate filter and NOx reducing catalyst. By doing this, the particulate filter rectifies the flow the exhaust as EX, so that the detection accuracy of the pressure of the exhaust gas EX by the pressure sensor is improved. As a result, it is possible to obtain the flow rate of the exhaust gas EX flowing through each branch passage and the flow rate of NOx flowing through each branch passage with a higher degree of accuracy. In the embodiment, the NOx detection sensor 15 may be arranged on the upstream side of the NOx reducing catalyst in the flowing direction of the exhaust gas EX.

In the embodiment, the number of the branch passages and the NOx reducing catalysts is two each. However, the number of these is not limited to two, but may be three or more. When the number of the branch passages and the NOx reducing catalysts is three or more, the flow rate $Q_{mi}$ of the exhaust gas EX flowing through each NOx reducing catalyst is represented by Formula (17) and Formula (18). Here, i is a suffix to identify a plurality of branch passages and NOx reducing catalysts and is an integer greater than or equal to 1. $P_{ui}$ is the pressure of the exhaust gas EX on the upstream side of the NOx reducing catalyst, $P_{di}$ is the pressure of the exhaust gas EX on the downstream side of the NOx reducing catalyst, and $T_i$ is the temperature of the exhaust gas EX on the upstream side of the NOx reducing catalyst. $D1_i$ and $D2_i$ are constants.

$$Q_{mi} = k \times \sqrt{\frac{P_{ui} \times (P_{ui} - P_{di})}{T_i}} \quad (17)$$

$$Q_{mi} = D1_i \times \sqrt{\frac{P_{ui} \times (P_{ui} - P_{di})}{T_i}} + D2_i \quad (18)$$

Formula (17) is a formula in which a relationship between the flow rate $Q_{mi}$ and the pressure parameter is a linear function passing through the origin as illustrated by the straight line La illustrated in FIG. 4. Formula (17) corresponds to Formula (4) and Formula (5) described above. Formula (18) is a formula in which a relationship between the flow rate and the pressure parameter is a linear function that does not pass through the origin as illustrated by the straight line Lb illustrated in FIG. 4. Formula (18) corresponds to Formula (6) and Formula (7) described above. A flow rate ratio $\epsilon_i$ between a plurality of NOx reducing catalysts is represented by Formula (19). Here, j in Formula (19) is a total number of NOx reducing catalysts included in the exhaust as processing device 20 and is an integer greater than or equal to 2. At this time, the aforementioned suffix i varies from 1 to j.

$$\varepsilon_i = \frac{Q_{mi}}{\sum_{i=1}^{J} Q_{mi}} \quad (19)$$

The flow rate $Q_{mi}'$ of the exhaust gas EX flowing through each NOx reducing catalyst is represented by $Q_{mi}'=\epsilon_i \times Q_m$ by using the flow rate ratio $\epsilon_i$ obtained from Formula (19) and the total flow rate $Q_m$ of the exhaust gas EX. When the flow rate $Q_{mi}'$ of the exhaust gas EX flowing through each NOx reducing catalyst is obtained, it is possible to obtain the flow rate of NOx flowing through each NOx reducing catalyst from the concentration of NOx contained in the exhaust gas EX. When the flow rate of NOx flowing through each NOx reducing catalyst is obtained, it is possible to obtain the amount of reducing agent R required for each NOx reducing catalyst.

In the embodiment, the reducing agent R is not limited to urea, but may be, for example, hydrocarbon such as light oil, ethanol, isopropyl alcohol, and dimethyl ether. When light oil is used as the reducing agent R, the fuel of the diesel engine 10 can be used, so that it is not necessary to separately provide a tank of the reducing agent R. As a result, it is possible to simplify the structure of the exhaust gas processing device 20. In the embodiment, the NOx reducing catalyst only has to reduce NOx by the reducing agent R, so that the NOx reducing catalyst is not limited to a selective catalyst.

In the embodiment, an example is described in which the diesel engine 10 exhausts the exhaust gas EX to one exhaust pipe 21, the exhaust gas EX is branched into a plurality of branch passages, and the exhaust gas EX is processed by the NOx reducing catalyst provided in each branch passage. However, the embodiment is not limited to the example in which the exhaust gas of the diesel engine 10, which is exhausted to one exhaust pipe 21, is branched. For example, the embodiment can also be applied to a diesel engine, which has a plurality of cylinder banks in which a plurality of cylinders are arranged in-line, that is, so-called V-type cylinder arrangement and a horizontally opposed cylinder arrangement, and which has a branch passage and a NOx reducing catalyst for each cylinder bank. In this case, as the fuel injection amount $M_{Fl}$ used when obtaining the total flow rate $Q_m$ of the exhaust gas EX, a total sum of fuel injection amounts of each cylinder bank may be used. As described, above, the flow rate of the exhaust gas EX flowing through each branch passage is obtained based on the pressure in each branch passage. In this way, the embodiment can be applied to a diesel engine which has a plurality of branch passages through which the exhaust gas EX passes and in which a NOx reducing catalyst is provided to each branch passage.

<First Modified Example of Exhaust Gas Processing Device>

Figure 6:
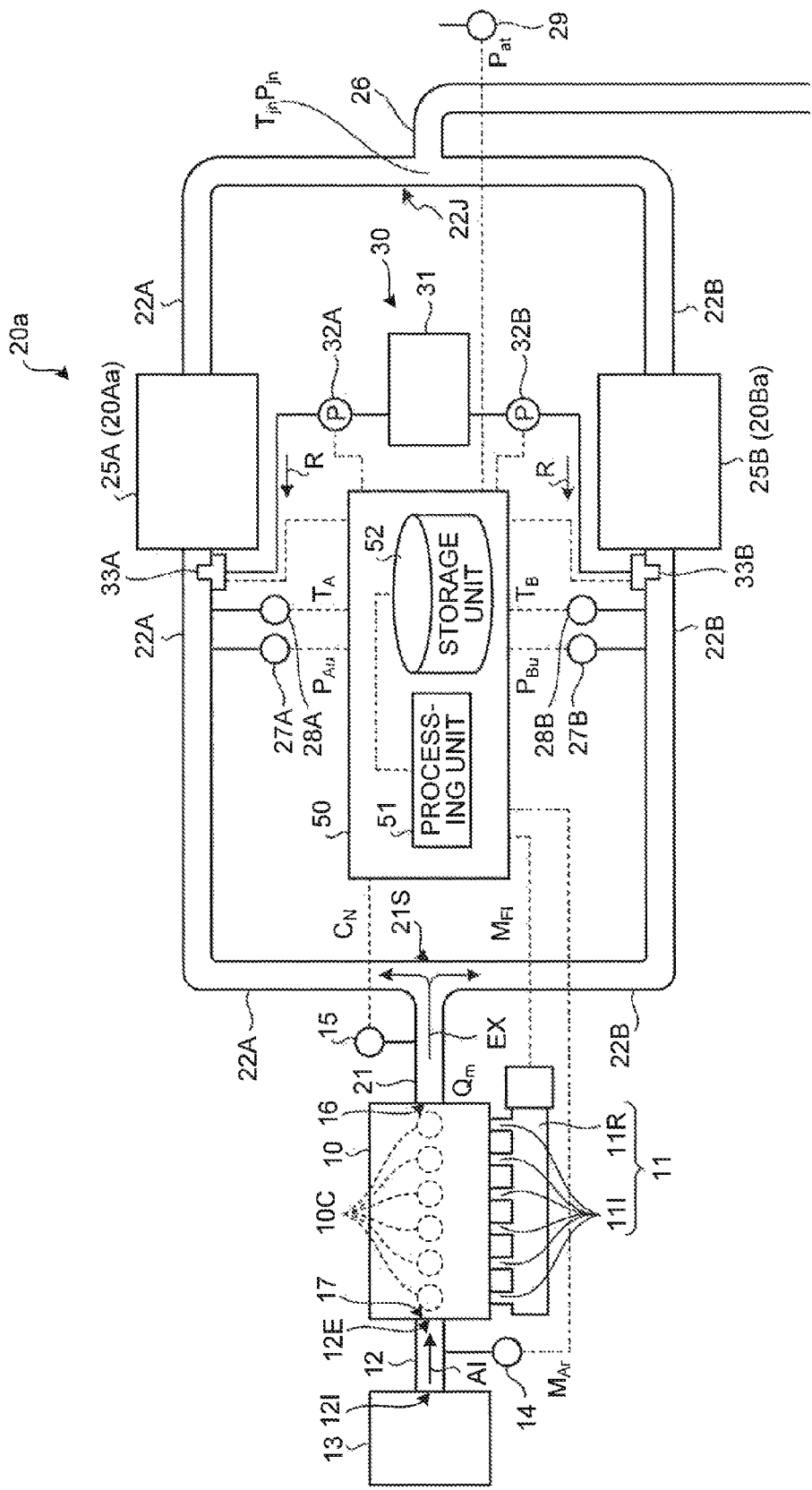
FIG. 6 is a schematic diagram illustrating a diesel engine including an exhaust gas processing device according to a first modified example of the embodiment.

FIG. 6 is a schematic diagram illustrating a diesel engine including an exhaust gas processing device according to a first modified example of the embodiment. An exhaust gas processing device 20a illustrated in FIG. 6 does not include the first DPF 23A and the second DPF 23B included in the exhaust gas processing device 20 illustrated in FIG. 1. Therefore, a first exhaust pas purification unit 20Aa includes only the first catalyst 25A and a second exhaust gas purification unit 205a includes only the second catalyst 25S. In this way, in the exhaust gas processing device 20a, the first DPF 23A and the second DPF 23S may be omitted or may be used as needed.

<Second Modified Example of Exhaust. Gas Processing Device>

Figure 7:
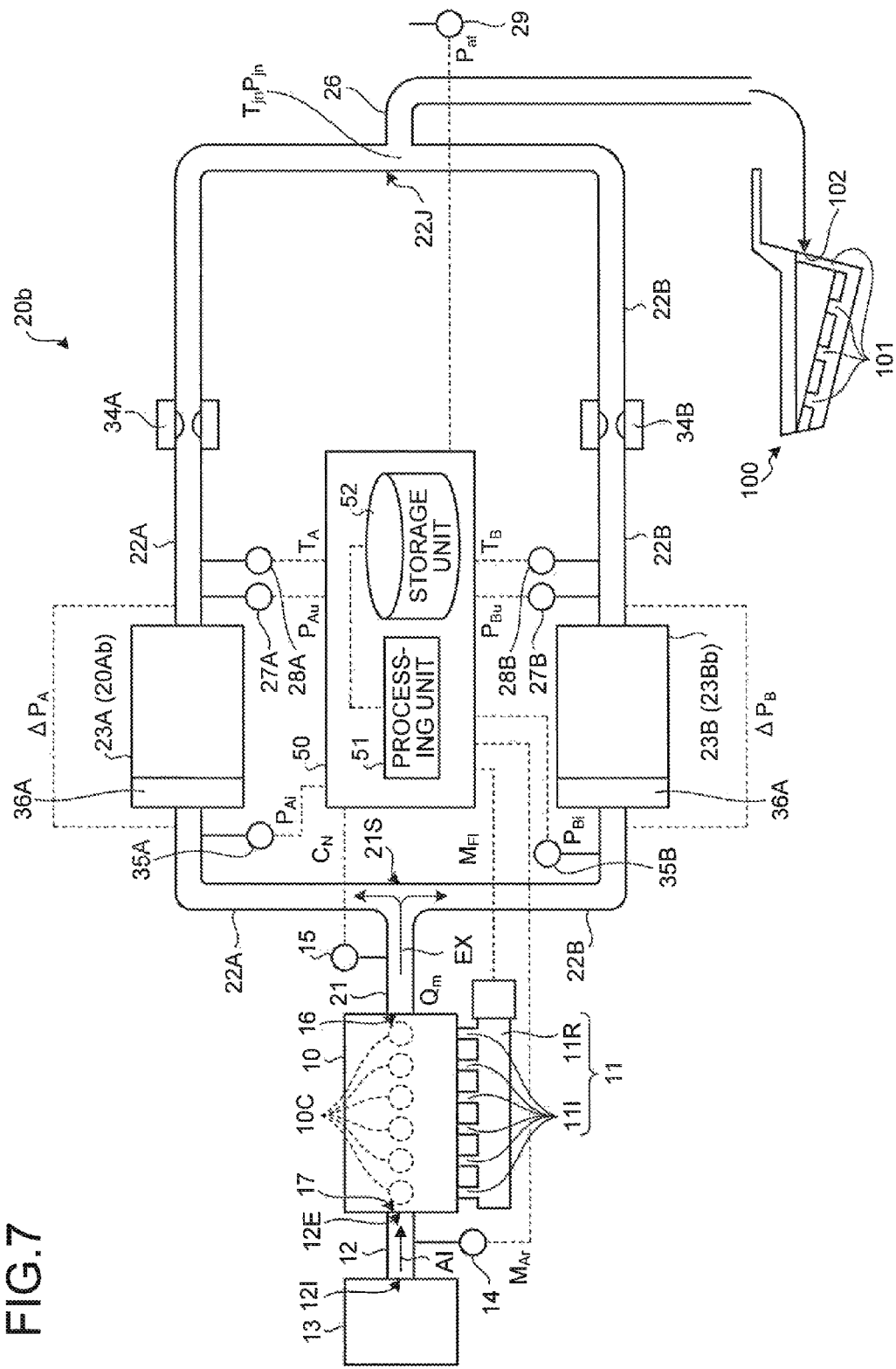
FIG. 7 is a schematic diagram illustrating a diesel engine including an exhaust gas processing device according to a second modified example of the embodiment.

FIG. 7 is a schematic diagram illustrating a diesel engine including an exhaust gas processing device according to a second modified example of the embodiment. An exhaust gas processing device 20b illustrated in FIG. 7 includes only the first DPF 23A and the second DPF 23B included in the exhaust gas processing device 20 illustrated in FIG. 1 and does not include the first catalyst 25A and the second catalyst 25B. Therefore, a first exhaust gas purification unit 20Ab includes only the first DPF 23A, and a second exhaust gas purification unit 20Bb includes only the second DPF 23B. In this way, in the exhaust gas processing device 20b, the first catalyst 25A and the second catalyst 25B may be omitted or may be used as needed.

The exhaust gas processing device 20b is provided with a first throttle unit 34A and a second throttle unit 34B at the first branch pipe 22A and the second branch pipe 22B on the downstream side of the first exhaust gas purification unit 20Ab and the second exhaust gas purification unit 20Bb, respectively, as a throttle unit that reduces the sectional area of the first branch pipe 22A and the second branch pipe 22B. The first pressure sensor 27A and the first temperature sensor 28A are arranged between the first exhaust gas purification unit 20Ah, that is, the first DPF 23A, and the first throttle unit 34A. The second pressure sensor 27B and the second temperature sensor 28B are arranged between the second exhaust gas purification unit 20Bb, that is, the second DPF 23B, and the second throttle unit 34B. The first throttle unit 34A and the second throttle unit 34B correspond to the first catalyst 25A and the second catalyst 25B of the exhaust gas processing device 20 illustrated in FIG. 1.

The exhaust gas processing device 20b can secure the pressure and the pressure variation of the exhaust gas EX on the upstream side of the first throttle unit 34A and the second throttle unit 34B by providing the first throttle unit 34A and the second throttle unit 34B on the downstream side of the first pressure sensor 27A and the second pressure sensor 27B. Therefore, the exhaust gas processing device 20b can measure the pressure of the exhaust gas EX in a state in which the pressure of the exhaust gas EX is relatively high, so that the exhaust gas processing device 20b can suppress degradation in accuracy when measuring the pressure of the exhaust gas EX, which is used to obtain the first flow rate $Q_{mA}$ and the second flow rate $Q_{mB}$, that is, the pressure of the exhaust gas EX flowing through the first branch pipe 22A and the pressure of the exhaust gas EX flowing through the second branch pipe 22B. As a result, although the exhaust gas processing device 20b does not include first catalyst 25A and the second catalyst 25B as resistive elements, the exhaust gas processing device 20b can improve accuracy when obtaining the first flow rate $Q_{mA}$ and the second flow rate $Q_{mB}$.

The exhaust gas processing device 20b includes a third pressure sensor 35A on the upstream side of the first DPF 23A and a fourth pressure sensor 35B on the upstream side of the second DPF 23B. The third pressure sensor 35A detects a pressure $P_{Ai}$ of the exhaust gas EX flowing through the first branch pipe 22A on the upstream side of the first DPF 23A, and the fourth pressure sensor 35B detects a pressure $P_{Bi}$ of the exhaust gas EX flowing through the second branch pipe 22B on the upstream side of the second DPF 23S. It is possible to obtain a differential pressure (may be referred to as a first differential pressure) $\Delta P_A$ ($=P_{Ai}-P_{Au}$) between inlet and outlet of the first DPF 23A by the third pressure sensor 35A and the first pressure sensor 27A. In the same manner, it is possible to obtain a differential pressure (may be referred to as a second differential pressure) $\Delta P_B$ ($=P_{Bi}-P_{Bu}$) between inlet and outlet of the second DPF 235 by the fourth pressure sensor 35B and the second pressure sensor 27B.

Figure 8:
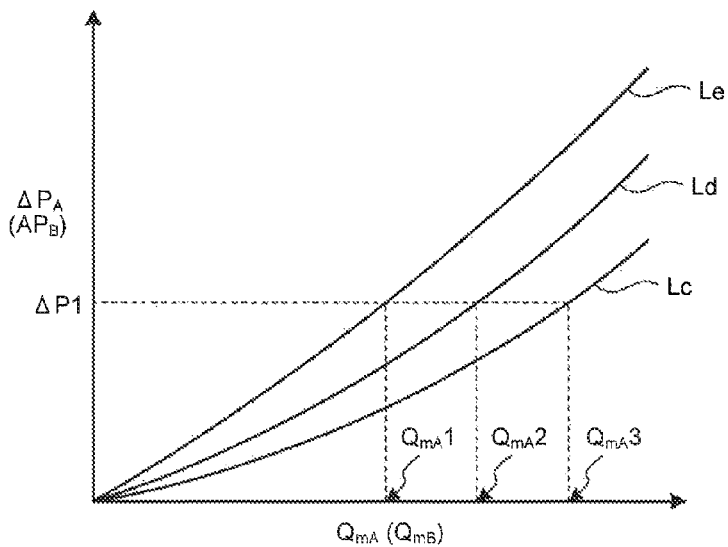
FIG. 8 is a diagram illustrating an example of a relationship between first and second differential pressures and flow rates of exhaust gas flowing through a first DPF and a second DPF by differentiating amounts of soot accumulated in the first DPF and the second DPF.

FIG. 8 is a diagram illustrating an example of a relationship between the first and the second differential pressures and the flow rates of exhaust gas flowing through the first DPF and the second DPF by differentiating amounts of soot accumulated in the first DPF and the second DPF. Soot is accumulated in the first DPF 23A and the second DPF 23B according to the operating time of the diesel engine 10. The curves Lc, Ld, and Le in FIG. 8 respectively represent relationships between the first and the second differential pressures $\Delta P_A$ and $\Delta P_B$ at a certain amount of accumulated soot and the flow rates $Q_{mA}$ and $Q_{mB}$ of the exhaust gas EX flowing through the first DPF 23A and the second DPF 23B. The curves Lc, Ld, and Le indicate that the accumulation amount of soot accumulated in the first DPF 23A and the second DPF 23B increases in this order. When the accumulation amount of soot accumulated in the first DPF 23A and the second DPF 23B is constant, the first differential pressure $\Delta P_A$ and the second differential pressure $\Delta P_B$ increase as the flow rate $Q_{mA}$ and the flow rate $Q_{mB}$ of the exhaust gas EX flowing through the first DPF 23A and the second DPF 23B increase.

For example, when obtaining the accumulation amount of soot accumulated in the first DPF 23A, the processing unit 51 of the control device 50 obtains the first differential pressure $\Delta P_A$ from the third pressure sensor 35A and the first pressure sensor 27A. Further, as described above, the processing unit 51 obtains the flow rate $Q_{mA}$ of the exhaust gas EX flowing through the first branch pipe 22A based on the pressure $P_{Au}$ detected by the first pressure sensor 27A and the like. When the obtained first differential pressure is $\Delta P1$ and the obtained flow rate is $Q_{mA}1$, the accumulation amount of soot accumulated in the first DPF 23A is an amount corresponding to the curve Le. In the same manner, when the obtained first differential pressure is $\Delta P1$ and the obtained flow rate is $Q_{mA}2$, the accumulation amount of soot accumulated in the first DPF 23A is an amount corresponding to the curve Ld. Further, when the obtained first differential pressure is $\Delta P1$ and the obtained flow rate is $Q_{mA}3$, the accumulation amount of soot accumulated in the first DPF 23A is an amount corresponding to the curve Lc. The same goes for obtaining the accumulation amount of soot accumulated in the second DPF 23B.

The storage unit 52 of the control device 50 stores a map describing a relationship between the first and the second differential pressures and the flow rates of exhaust gas flowing through the first DPF and the second DPF as illustrated in FIG. 8. The processing unit 51 can obtain the accumulation amount of soot accumulated in the first DPF 23A by giving the first differential pressure $\Delta P_A$ and the flow rate $Q_{mA}$ of the exhaust as EX flowing through the first branch pipe 22A to the aforementioned map. In the same manner, the processing unit 51 can obtain the accumulation amount of soot accumulated in the second DPF 23B by giving the second differential pressure $\Delta P_B$ and the flow rate $Q_{mB}$ of the exhaust gas EX flowing through the second branch pipe 22B to the aforementioned map.

When the accumulation amount of soot accumulated in the first DPF 23A and the second DPF 23B increases, the temperature of the exhaust gas EX is raised by burning fuel by DOCs 36A and 36B arranged on the upstream site of the first DPF 23A and the second DPF 23B. Then, the first DPF 23A and the second DPF 23B are revitalized by burning the accumulated soot by the exhaust gas EX whose temperature is raised. The amount of fuel supplied to the DOCs 36A and 36B is changed according to the flow rate of the exhaust gas EX flowing through the DOCs 36A and 36B, that is, the flow rates $Q_{mA}$ and of the exhaust gas EX flowing through a first branch pipe 22a and the second branch pipe 22B. The exhaust gas processing device 20b can obtain the flow rates $Q_{mA}$ and $Q_{mB}$ of the exhaust gas EX flowing through the first branch pipe 22a and the second branch pipe 22B. As a result, when revitalizing the first DPF 23A and the second DPF 23B, the exhaust gas processing device 20b can provide an appropriate amount of fuel to the DOCs 36A and 36B, so that the exhaust gas processing device 20b can prevent insufficient revitalization or excessive heating of the DOCs 36A and 36B and the like.

Figure 9:
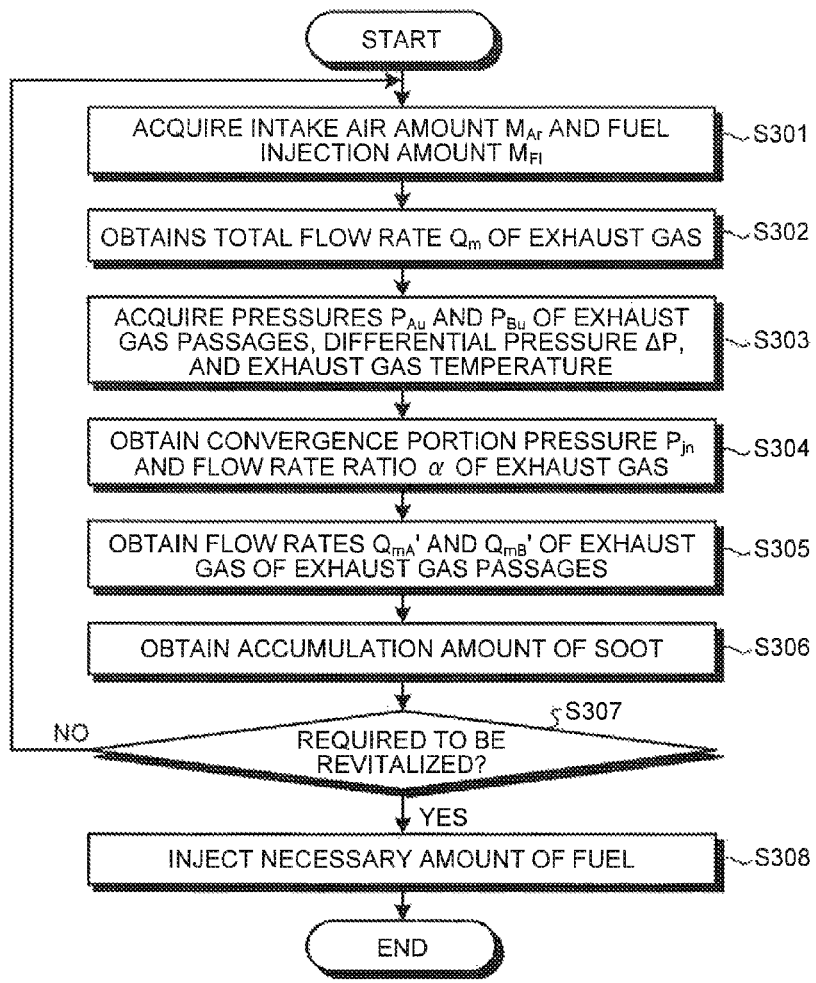
FIG. 9 is a flowchart illustrating an example of exhaust as processing using the exhaust gas processing device according to the second modified example of the embodiment.

FIG. 9 is a flowchart illustrating an example of exhaust gas processing using the exhaust gas processing device according to the second modified example of the embodiment. This exhaust as processing method is performed when the accumulation amount of soot accumulated in the first DPF 23A and the second DPF 23B is obtained and the first DPF 23A and the second DPF 23B are revitalized as needed. Steps S301 to S305 are the same as steps S201 to S205 in the flowchart illustrated in FIG. 5. In step S306, the processing unit 51 of the control device 50 illustrated in FIG. 7 obtains the accumulation amount of soot accumulated in the first DPF 23A or the like from the first differential pressure the flow rate $Q_{mA}$ of the exhaust gas EX, and the like by the method described above.

In step S307, it the accumulation amount exceeds a predetermine threshold value and the first DPF 23A or the like is required to be revitalized (step S307, Yes), the processing unit 51 advances the process to step S308. In step S308, the processing unit 51 obtains the amount of fuel supplied to the DOCs 36A and 36B based on the flow rates $Q_{mA}$ and $Q_{mB}$ of the exhaust gas EX flowing through the first branch pipe 22a and the second branch pipe 22B and injects fuel, the amount of which is necessary to drive or revitalize the diesel engine 10, from the injectors 11I. The fuel used for the revitalization is supplied to the DOCs 36A and 36B from the exhaust pipe 21 of the diesel engine 10 through the first branch pipe 22A and the second branch pipe 22B. In step S307, if the accumulation amount is smaller than or equal to the threshold value and the first DPF 23A or the like is not required to be revitalized (step S307, No), the processing unit 51 repeatedly performs steps S301 to S307. In this way, the second modified example is effective when obtaining the accumulation amount of soot accumulated in the DPF in a case in which the exhaust gas exhausted from the diesel engine 10 is branched into a plurality of passages and purified and then the purified exhausted gas is converged and exhausted.

While the embodiment and the modified examples of the embodiment have been described, the embodiment is not limited by the above description. The components of the embodiment described above include components which those skilled in the art can easily perceive, substantially identical components, and components within an equivalent range. Further, the aforementioned components can be arbitrarily combined. The components can be removed, replaced, and modified in various manners without departing from the scope of the embodiment. The diesel engine according to the embodiment, and devices and apparatuses, to which the control method of the diesel engine is applied, are not particularly limited.

REFERENCE SIGNS LIST

10 DIESEL ENGINE
11 FUEL INJECTION DEVICE
12 INTAKE PIPE
13 AIR CLEANER
14 INTAKE AIR AMOUNT SENSOR
15 NOX DETECTION SENSOR 20, 20a, 20b EXHAUST GAS PROCESSING DEVICE
20A, 20Aa, 20Ab FIRST EXHAUST GAS PURIFICATION UNIT
20B, 20Ba, 20Bb SECOND EXHAUST GAS PURIFICATION UNIT
21 EXHAUST PIPE
21S BRANCH PORTION
22J CONVERGENCE PORTION
22A FIRST BRANCH PIPE
22B SECOND BRANCH PIPE
23A FIRST DPF
23B SECOND DPF
25A FIRST CATALYST
25B SECOND CATALYST
26 SECOND EXHAUST GAS PASSAGE
27A FIRST PRESSURE SENSOR
27B SECOND PRESSURE SENSOR
28A FIRST TEMPERATURE SENSOR
28B SECOND TEMPERATURE SENSOR
29 ATMOSPHERIC PRESSURE SENSOR
30 REDUCING AGENT SUPPLY DEVICE
34A FIRST THROTTLE UNIT
34B SECOND THROTTLE UNIT
35A THIRD PRESSURE SENSOR
35B FOURTH PRESSURE SENSOR
50 CONTROL DEVICE
51 PROCESSING UNIT
52 STORAGE UNIT
100 VESSEL
101 HEATING PIPE
EX EXHAUST GAS

The invention claimed is:

1. An exhaust gas processing device comprising:
an exhaust gas introduction passage that exhausts exhaust gas exhausted from a diesel engine;
a plurality of first exhaust gas passages which are branched from the exhaust gas introduction passage and which exhaust the exhaust gas;
an exhaust gas purification unit which is provided to each of the first exhaust gas passages and which purifies the exhaust gas;
a second exhaust gas passage which is provided to a portion where the plurality of first exhaust gas passages converge and which exhausts the exhaust gas exhausted from the plurality of first exhaust gas passages;
an exhaust gas temperature sensor that detects a temperature of the exhaust gas at a convergence portion where the plurality of first exhaust gas passages converge;
an atmospheric pressure sensor that detects an atmospheric pressure; and
a processing unit that obtains a convergence portion pressure which is a pressure at the convergence portion based on a total flow rate of the exhaust gas exhausted from the diesel engine, which is obtained while the diesel engine is operating, the temperature of the exhaust gas detected by the exhaust gas temperature sensor, and the atmospheric pressure detected by the atmospheric pressure sensor,
wherein each of the exhaust gas purification units includes a reducing catalyst which is provided to each of the first exhaust gas passages and which reduces NOx in the exhaust gas by a reducing agent,
each of the first exhaust gas passages includes a particular filter provided on an upstream side of each of the reducing catalysts in an exhaust gas flowing direction, and a pressure sensor which is arranged between each pair of the particular filter and the reducing catalysts and which detects a pressure in each of the first exhaust gas passages, and
the processing unit obtains a flow rate of exhaust gas flowing through each of the first exhaust gas passages based on at least the convergence portion pressure and the pressure in each of the first exhaust gas passages, which is detected by the pressure sensor,
whereby the processing unit supplies an appropriate amount of reducing agent to each NOx reducing catalyst to convert NOx in the exhaust gas based on the obtained flow rates through each of the first exhaust gas passages.

2. The exhaust gas processing device according to claim 1, wherein a throttle unit that reduces a sectional area of the first exhaust gas passage is provided at each of the first exhaust gas passages provided on a downstream side of the exhaust gas purification unit in each exhaust gas flowing direction.

3. The exhaust gas processing device according to claim 2, wherein the processing unit obtains the total flow rate from an intake air amount of the diesel engine and a fuel injection amount to the diesel engine.

4. The exhaust gas processing device according to claim 3, wherein
an exhaust gas temperature sensor is provided to each of the first exhaust gas passages and detects a temperature of exhaust gas flowing through each of the first exhaust gas passages, and
the processing unit obtains a flow rate of exhaust gas flowing through each of the first exhaust gas passages by further using the temperature of the exhaust gas flowing through each of the first exhaust gas passages.

5. A diesel engine comprising the exhaust gas processing device according to claim 1.

6. An exhaust gas processing device comprising:
an exhaust gas introduction passage that exhausts exhaust gas exhausted from a diesel engine;
a plurality of first exhaust gas passages which are branched from the exhaust gas introduction passage and which exhaust the exhaust gas;
an exhaust gas purification unit which is provided to each of the first exhaust gas passages and which purifies the exhaust gas;
a second exhaust gas passage which is provided to a portion where the plurality of first exhaust gas passages converge and which exhausts the exhaust gas exhausted from the plurality of first gas passages;
an exhaust gas temperature sensor that detects a temperature of the exhaust gas at a convergence portion where the plurality of first exhaust gas passages converge;
an atmospheric pressure sensor that detects an atmospheric pressure; and
a processing unit that obtains a convergence portion pressure which is a pressure at the convergence portion based on the total flow rate of the exhaust gas exhausted from the diesel engine obtained while the diesel engine is operating, the temperature of the exhaust gas detected by the exhaust gas temperature sensor, and the atmospheric pressure detected by the atmospheric pressure sensor,
wherein each of the exhaust gas purification units is provided to each of the first exhaust gas passages and which includes a reducing catalyst that reduces NOx in the exhaust gas by a reducing agent,
each of the first exhaust gas passages includes
a NOx detection sensor which is arranged on an upstream side of the reducing catalyst in an exhaust gas flowing direction and which detects a concentration of NOx contained in the exhaust gas exhausted from the diesel engine, and a pressure sensor which is arranged on an upstream side of each of the reducing catalysts in the exhaust gas flowing direction and which detects a pressure in each of the first exhaust gas passages, and the processing unit obtains a flow rate ratio of the exhaust gas flowing through each of the first exhaust gas passages based on a detection value of each of the pressure sensors, obtains a flow rate of the exhaust gas flowing through each of the first exhaust gas passages based on the obtained flow rate ratio and the total flow rate, obtains a flow rate of NOx in each of the first exhaust gas passages from the obtained flow rate of the exhaust gas in each of the first exhaust gas passages and the concentration of NOx detected by the NOx detection sensor, and determines an amount of reducing agent to be given to each of the reducing catalysts from the obtained flow rate of NOx in each of the first exhaust gas passages, whereby the processing unit supplies the determined amount of reducing agent to each NOx reducing catalyst to convert NOx in the exhaust gas.

7. A diesel engine comprising the exhaust gas processing device according to claim 6.

8. The exhaust gas processing device according to claim 6, wherein the processing unit obtains the total flow rate from an intake air amount of the diesel engine and a fuel injection amount to the diesel engine.

9. The exhaust gas processing device according to claim 8, wherein an exhaust gas temperature sensor is provided to each of the first exhaust gas passages and detects a temperature of exhaust gas flowing through each of the first exhaust gas passages, and the processing unit obtains a flow rate of exhaust gas flowing through each of the first exhaust gas passages by further using the temperature of the exhaust gas flowing through each of the first exhaust gas passages.

10. The exhaust gas processing device according to claim 8, wherein a particulate filter is provided on an upstream side of each of the reducing catalysts in the exhaust gas flowing direction, and each of the pressure sensors is arranged between each pair of the particulate filter and the reducing catalyst.

11. A diesel engine comprising the exhaust gas processing device according to claim 8.

12. An exhaust gas processing method which obtains a convergence portion pressure which is a pressure at a portion where a plurality of first exhaust gas passages converge, in an exhaust gas processing device in which exhaust gas is branched from an exhaust gas introduction passage that exhausts exhaust gas exhausted from a diesel engine into the plurality of first exhaust gas passages each of which includes an exhaust gas purification device that purifies the exhaust gas, and thereafter the plurality of first exhaust gas passages are converged to a second exhaust gas passage and the exhaust gas is exhausted from the second exhaust gas passage, the exhaust gas processing method comprising:

acquiring a total flow rate of exhaust gas exhausted from the diesel engine while the diesel engine is operating, a temperature of the exhaust gas at a convergence portion where the plurality of first exhaust gas passages converge, and the atmospheric pressure; and obtaining the convergence portion pressure based on the acquired total flow rate, the acquired temperature of the exhaust gas, and the acquired atmospheric pressure, wherein the exhaust gas purification device includes a reducing catalyst provided to each of the first exhaust gas passages, each of the first exhaust gas passages includes a particular filter provided on an upstream side of each of the reducing catalysts in an exhaust gas flowing direction, and a pressure sensor which is arranged between each pair of the particular filter and the reducing catalysts and which detects a pressure in each of the first exhaust gas passages, and the exhaust gas processing method further includes:

detecting a pressure in each of the first exhaust gas passages by the pressure sensor, obtaining a flow rate of exhaust gas flowing through each of the first exhaust gas passages based on at least the convergence portion pressure and the pressure in each of the first exhaust gas passages, which is detected by the pressure sensor, and reducing NOx in the exhaust gas by a reducing agent of the reducing catalyst based on the obtained flow rates through each of the first exhaust gas passages.

* * * * *